(12) United States Patent
Irwin et al.

(10) Patent No.: US 9,829,650 B2
(45) Date of Patent: *Nov. 28, 2017

(54) DUPLEX CLIP ASSEMBLY FOR FIBER OPTIC CONNECTORS

(71) Applicant: Panduit Corp., Tinley Park, IL (US)

(72) Inventors: Phillip J. Irwin, Frankfort, IL (US); John G. Dalton, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,883

(22) Filed: Jan. 27, 2017

(65) Prior Publication Data

US 2017/0139156 A1    May 18, 2017

Related U.S. Application Data

(60) Continuation of application No. 14/745,784, filed on Jun. 22, 2015, now Pat. No. 9,557,496, which is a continuation of application No. 14/317,849, filed on Jun. 27, 2014, now Pat. No. 9,063,303, which is a division of application No. 13/153,945, filed on Jun. 6, 2011, now Pat. No. 8,764,308.

(51) Int. Cl.
    *G02B 6/38*    (2006.01)

(52) U.S. Cl.
    CPC ......... *G02B 6/3879* (2013.01); *G02B 6/3825* (2013.01); *G02B 6/3885* (2013.01); *G02B 6/3887* (2013.01); *G02B 6/3893* (2013.01); *G02B 6/3898* (2013.01)

(58) Field of Classification Search
    CPC .. G02B 6/3879; G02B 6/3887; G02B 6/3893; G02B 6/3898
    See application file for complete search history.

(56) References Cited

U.S. PATENT DOCUMENTS

| 4,798,440 A | 1/1989 | Hoffer et al. |
| 4,872,736 A | 10/1989 | Myers et al. |
| 4,953,929 A | 9/1990 | Basista et al. |

(Continued)

FOREIGN PATENT DOCUMENTS

| CN | 101785153 A | 7/2010 |
| CN | 102016670 A | 4/2011 |

(Continued)

*Primary Examiner* — Daniel Petkovsek
(74) *Attorney, Agent, or Firm* — Christopher S. Clancy; James H. Williams; Christopher K. Marlow

(57) ABSTRACT

A duplex clip assembly for LC fiber optic plug connectors has a duplex housing, a crimp sleeve, and a housing cover. The duplex housing retains a portion of each fiber optic plug connector such as to allow each fiber optic plug connector to rotate relative to the duplex housing. The housing also has a bottom snap located on an underside. The housing cover encloses and retains the duplex housing with a clearance between the housing cover and the rest of the assembly. The housing cover also has a slot located on an underside configured to engage the bottom snap of the duplex housing such that the clearance fit allows an application of pressure on the sides of the housing cover to result in the slot being disengaged from the bottom snap. The clip assembly can also have a boot securely attached to the housing partially enclosing the fiber optic cable.

4 Claims, 29 Drawing Sheets

(56) References Cited

U.S. PATENT DOCUMENTS

| | | |
|---|---|---|
| 5,123,071 A | 6/1992 | Mulholland et al. |
| 5,268,982 A | 12/1993 | Schaffer et al. |
| 5,293,581 A | 3/1994 | DiMarco |
| 5,315,679 A | 5/1994 | Baldwin et al. |
| 5,321,784 A | 6/1994 | Cubukciyan et al. |
| 5,343,547 A | 8/1994 | Palecek |
| 5,398,295 A | 3/1995 | Chang et al. |
| 5,528,712 A | 6/1996 | Belenkiy et al. |
| 5,579,425 A | 11/1996 | Lampert et al. |
| 5,608,830 A | 3/1997 | Belenkiy et al. |
| 5,613,025 A | 3/1997 | Grois et al. |
| 5,638,474 A | 6/1997 | Lampert et al. |
| 5,675,682 A | 10/1997 | De Marchi |
| D413,302 S | 8/1999 | Sekiguchi et al. |
| 6,024,498 A | 2/2000 | Carlisle et al. |
| 6,250,817 B1 | 6/2001 | Lampert et al. |
| 6,357,934 B1 | 3/2002 | Driscoll et al. |
| 6,409,392 B1 | 6/2002 | Lampert et al. |
| 6,511,230 B1 | 1/2003 | Connelly et al. |
| 6,547,585 B2 | 4/2003 | Bradley et al. |
| 6,672,898 B2 | 1/2004 | Kahle et al. |
| 6,799,898 B2 | 10/2004 | Cheng et al. |
| 6,857,900 B2 | 2/2005 | Kleeberger et al. |
| D503,296 S | 3/2005 | Mason |
| 7,052,186 B1 | 5/2006 | Bates |
| 7,374,447 B2 | 5/2008 | Matsumoto |
| 7,381,087 B2 | 6/2008 | Alvarez |
| 7,407,331 B2 | 8/2008 | Momtsu et al. |
| RE40,622 E | 1/2009 | Lu |
| 7,588,373 B1 | 9/2009 | Sato et al. |
| 7,632,125 B2 | 12/2009 | Irwin et al. |
| 7,641,398 B2 | 1/2010 | O'Riorden et al. |
| 7,695,198 B1 | 4/2010 | Baechtle et al. |
| 7,712,970 B1 | 5/2010 | Lee |
| 8,152,384 B2 | 4/2012 | De Jong et al. |
| 8,152,385 B2 | 4/2012 | De Jong et al. |
| 8,221,007 B2 | 7/2012 | Peterhans et al. |
| 8,287,191 B2 | 10/2012 | Nielson et al. |
| 8,628,252 B2 | 1/2014 | Matsumoto et al. |
| 8,764,308 B2 | 7/2014 | Irwin et al. |
| 9,063,303 B2 | 6/2015 | Irwin et al. |
| 9,557,496 B2 * | 1/2017 | Irwin .................. G02B 6/3879 |
| 2004/0047565 A1 | 3/2004 | Cheng et al. |
| 2004/0247252 A1 | 12/2004 | Ehrenreich et al. |
| 2011/0081113 A1 | 4/2011 | Jones |

FOREIGN PATENT DOCUMENTS

| | | |
|---|---|---|
| DE | 202010009146 U1 | 10/2010 |
| JP | S58-103006 A | 6/1983 |
| JP | S62-104205 A | 5/1987 |
| JP | H05-33104 A | 2/1993 |
| JP | 2001-021767 A | 1/2001 |
| JP | 2001-141961 A | 5/2001 |
| JP | 2004-258094 A | 9/2004 |
| JP | 2008-122861 A | 5/2008 |
| JP | 2009-222932 A | 10/2009 |
| JP | 2009-229545 A | 10/2009 |
| JP | 2010197854 A | 9/2010 |
| WO | 2009135787 A1 | 11/2009 |
| WO | 2010099141 A1 | 9/2010 |
| WO | 2012151175 A2 | 11/2012 |

* cited by examiner

DUPLEX CLIP ASSEMBLY FOR FIBER OPTIC CONNECTORS

CROSS-REFERENCE TO RELATED APPLICATIONS

This application is a continuation of U.S. patent application Ser. No. 14/745,784, filed Jun. 22, 2015, which will issue as U.S. Pat. No. 9,557,496 on Jan. 31, 2017, which is a continuation of U.S. patent application Ser. No. 14/317,849, filed Jun. 27, 2014, which issued as U.S. Pat. No. 9,063,303 on Jun. 23, 2015; which is a divisional of U.S. patent application Ser. No. 13/153,945, filed Jun. 6, 2011, which issued as U.S. Pat. No. 8,764,308 on Jul. 1, 2014, the subject matter of which is hereby incorporated by reference in its entirety.

FIELD OF THE INVENTION

The present invention relates generally to fiber optic connectors and more specifically to duplex clip assemblies for LC type connectors.

BACKGROUND OF THE INVENTION

In fiber optic networks signals are often paired together, one for transmission and one for reception. As a result, it is often desirable to have an assembly that can keep the connectors paired together and arranged in the proper polarity. In addition, due to the high density of the equipment, it is also desirable to be able to remove connectors without having to reach the connector housings in order to depress the connector latches.

SUMMARY OF THE INVENTION

This application describes several embodiments of a duplex clip assembly for use in aiding the insertion and removal of a pair of LC fiber optic connectors. In one embodiment, the assembly includes a clip body with a hood. The clip body has a central wall, upper tabs and lower tabs configured to loosely retain a pair of LC connectors such as to allow the clip body to move axially relative to the LC connectors. The hood is configured to engage a camming surface on the LC connector latches when the clip body is moved axially rearward relative to the LC connector.

In a second embodiment, the assembly includes a duplex housing and a housing cover. The duplex housing retains the LC connectors such as to allow them to rotate. The housing cover has a hood protruding from the top configured to engage a camming surface on the LC connector latches.

DETAILED DESCRIPTION OF THE PREFERRED EMBODIMENTS

FIGS. 1-7 show a first embodiment of an LC duplex clip assembly 100. The assembly includes a pair of LC connectors 101, a clip body 102, and a boot 103.

Figure 1:
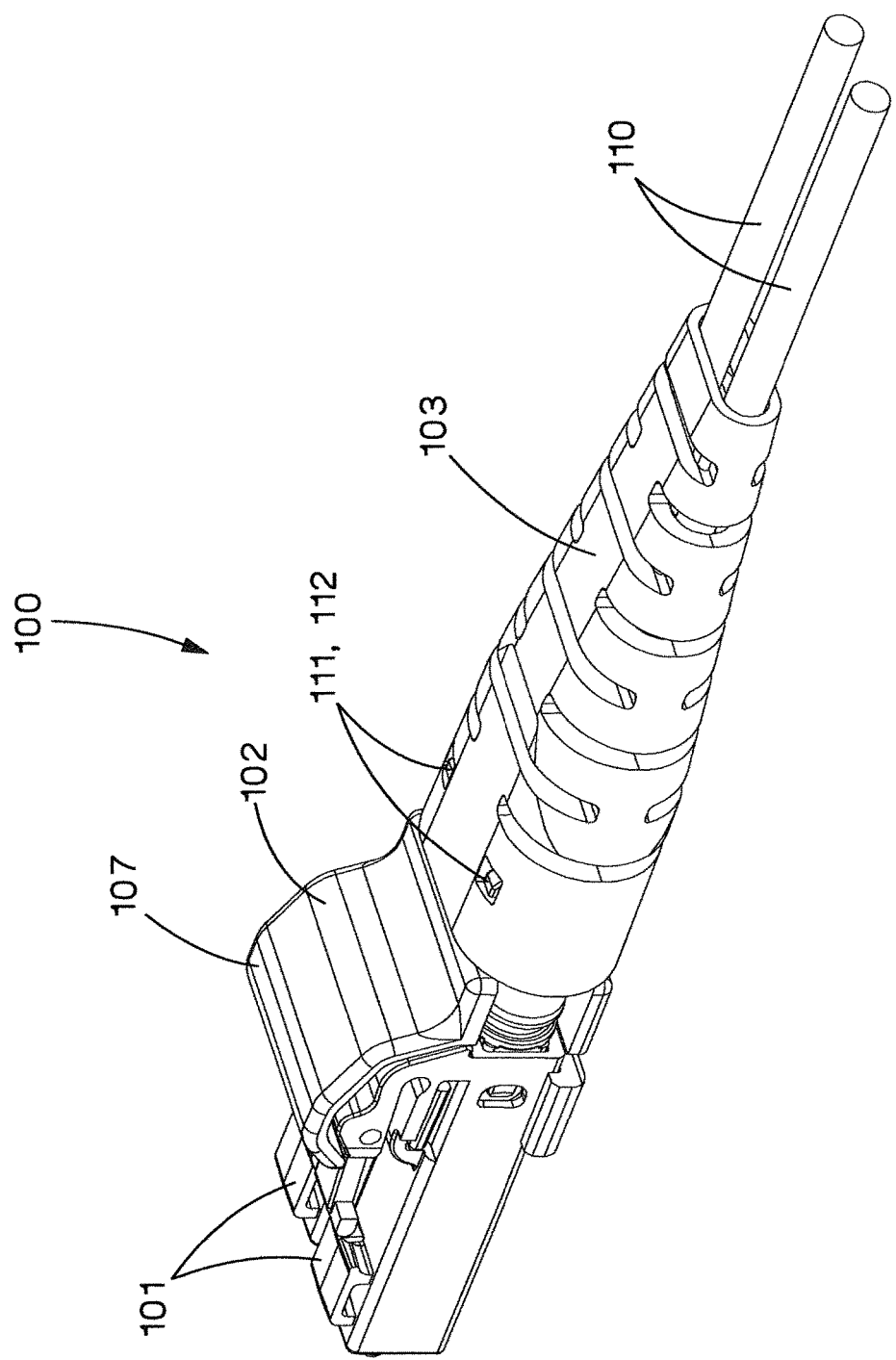
FIG. 1 is a perspective view of a first embodiment of an LC duplex clip assembly.
Figure 2:
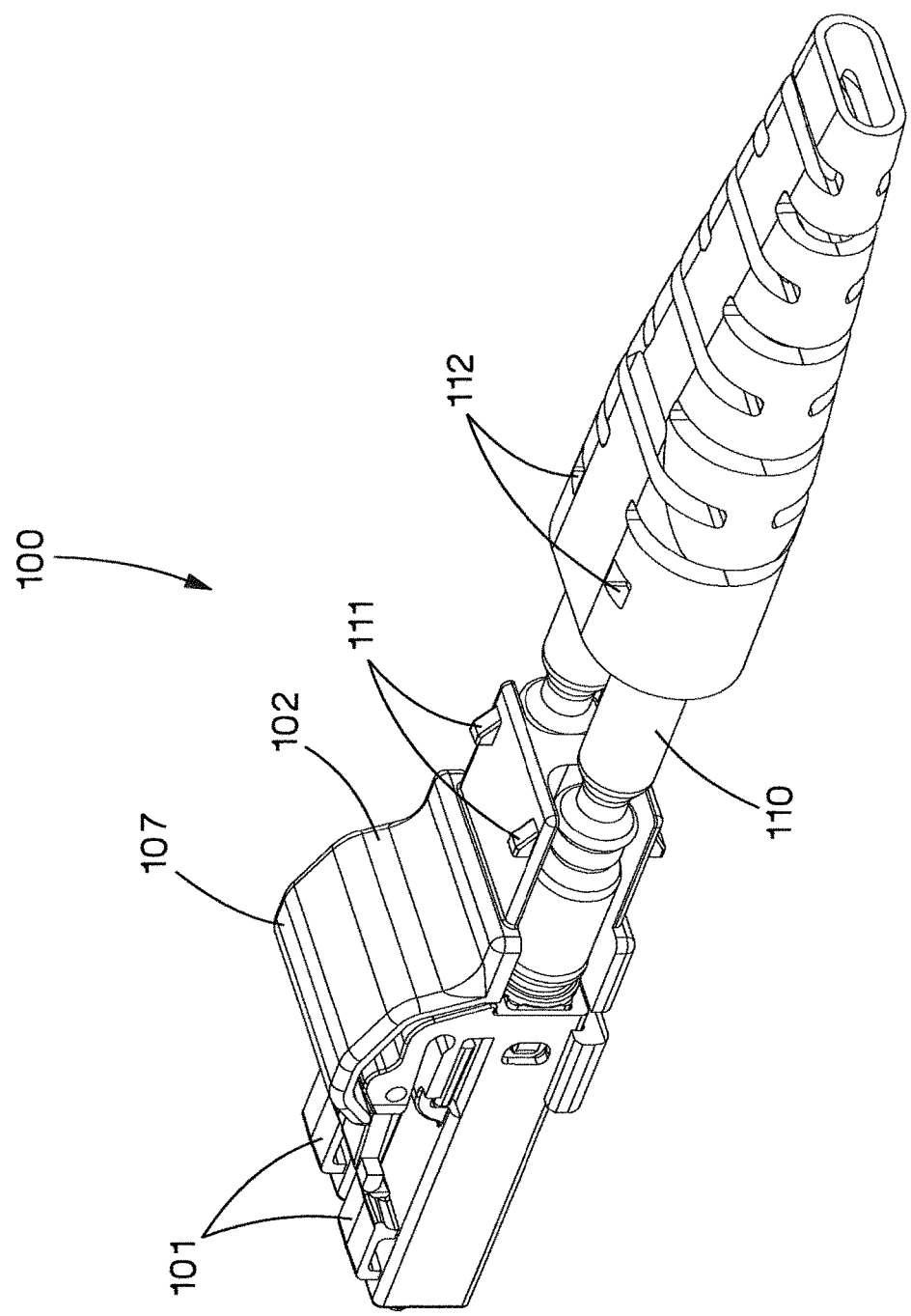
FIG. 2 is a perspective view of the LC duplex clip assembly of FIG. 1 with the boot detached from the clip body.
Figure 3:
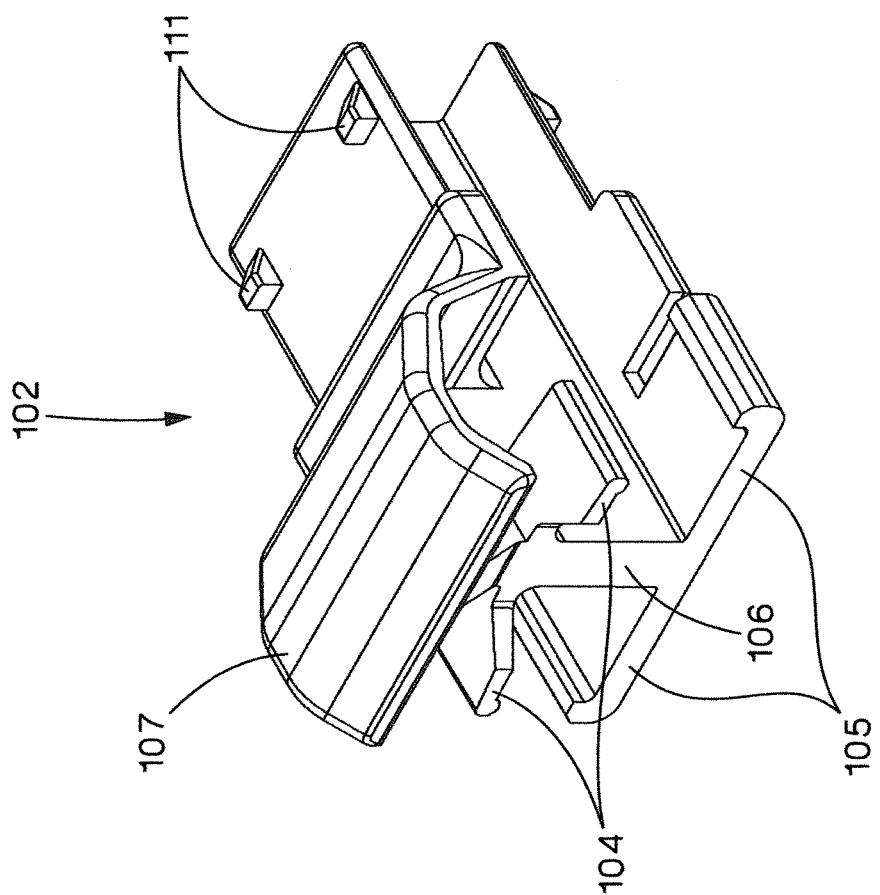
FIG. 3 is a perspective view of the clip body of the LC duplex clip assembly of FIG. 1.
Figure 4:
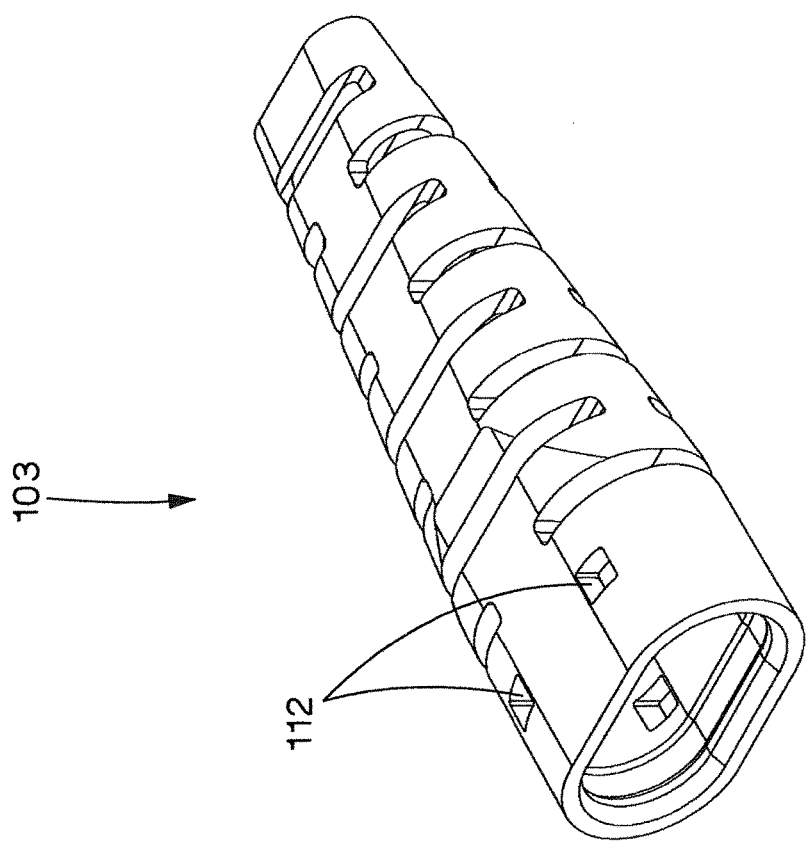
FIG. 4 is a perspective view of the boot of the LC duplex clip assembly of FIG. 1.
Figure 5:
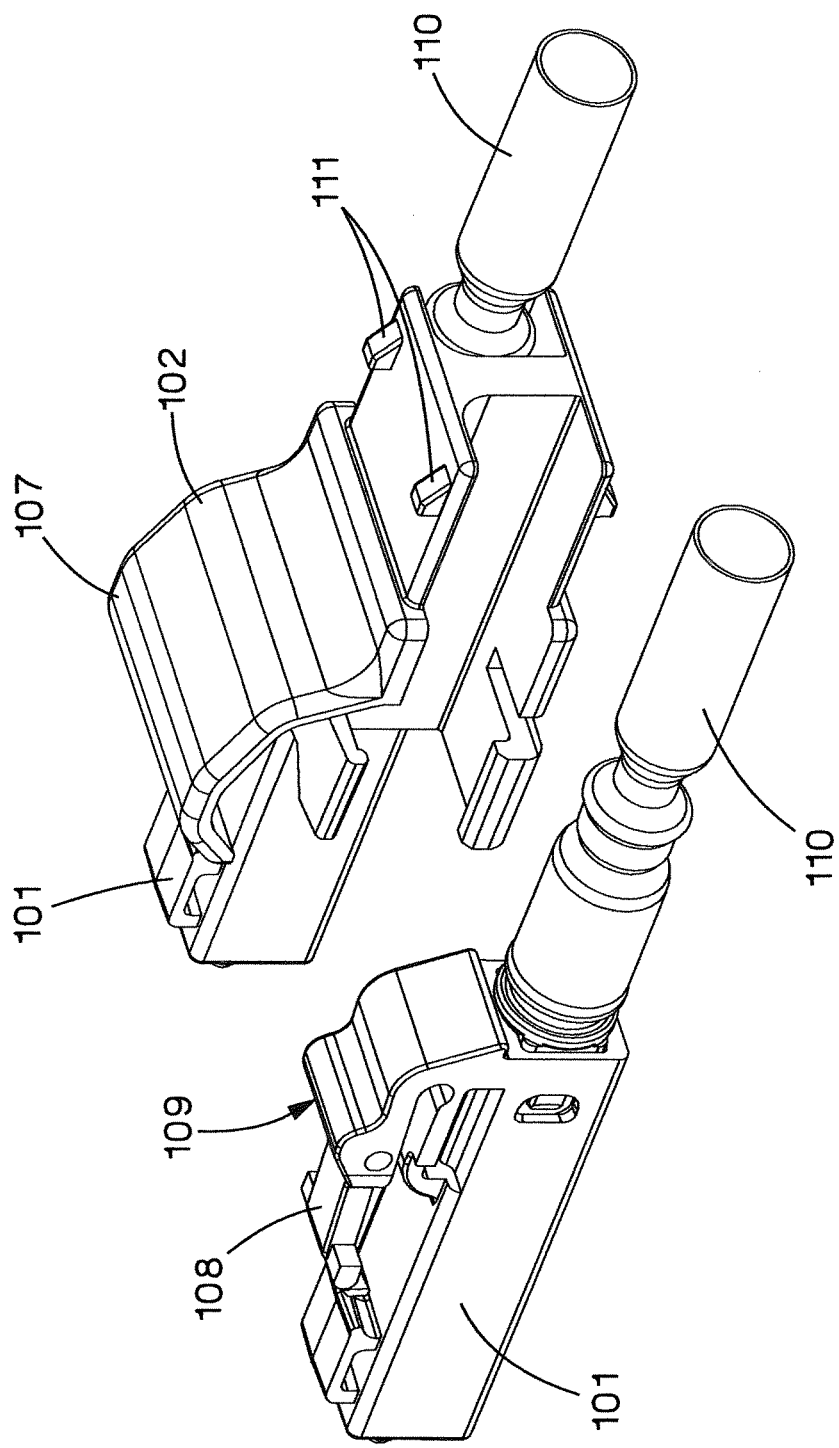
FIG. 5 is a perspective view showing the removal of an LC connector from the clip body of the LC duplex clip assembly of FIG. 1.

As best shown in FIG. 3, the clip body 102 has a set of upper tabs 104 and a set of lower tabs 105 connected by a central wall 106. The set of upper tabs 104 is perpendicular to the central wall 106 and parallel to the set of lower tabs 105. The upper tabs 104 and lower tabs 105 are configured to loosely retain the LC connectors 101 on either side of the central wall 106 such as to allow the clip body 102 to move axially relative to the LC connectors 101. The clip body also has a hood 107. The hood 107 protrudes from the top of the clip body 102. The hood 107 is configured to engage a camming surface 109 on the LC connector latches 108 when the boot 103 and clip body 102 are moved in an axially rearward direction relative to the LC connectors 101.

The boot 103 attaches to the clip body 102 and is designed to loosely encircle the cables 110 such as to allow the boot 103 to move axially relative to the cables 110 and LC connectors 101. In the embodiment shown in FIGS. 1-7, the boot 103 connects to the clip body 102 via engagement features 111, 112 on the clip body 102 and boot 103. The boot 103 can be manufactured from an elastomeric material to allow bend radius control while also allowing for adequate rigidity for gripping during connector removal and insertion.

Figure 6:
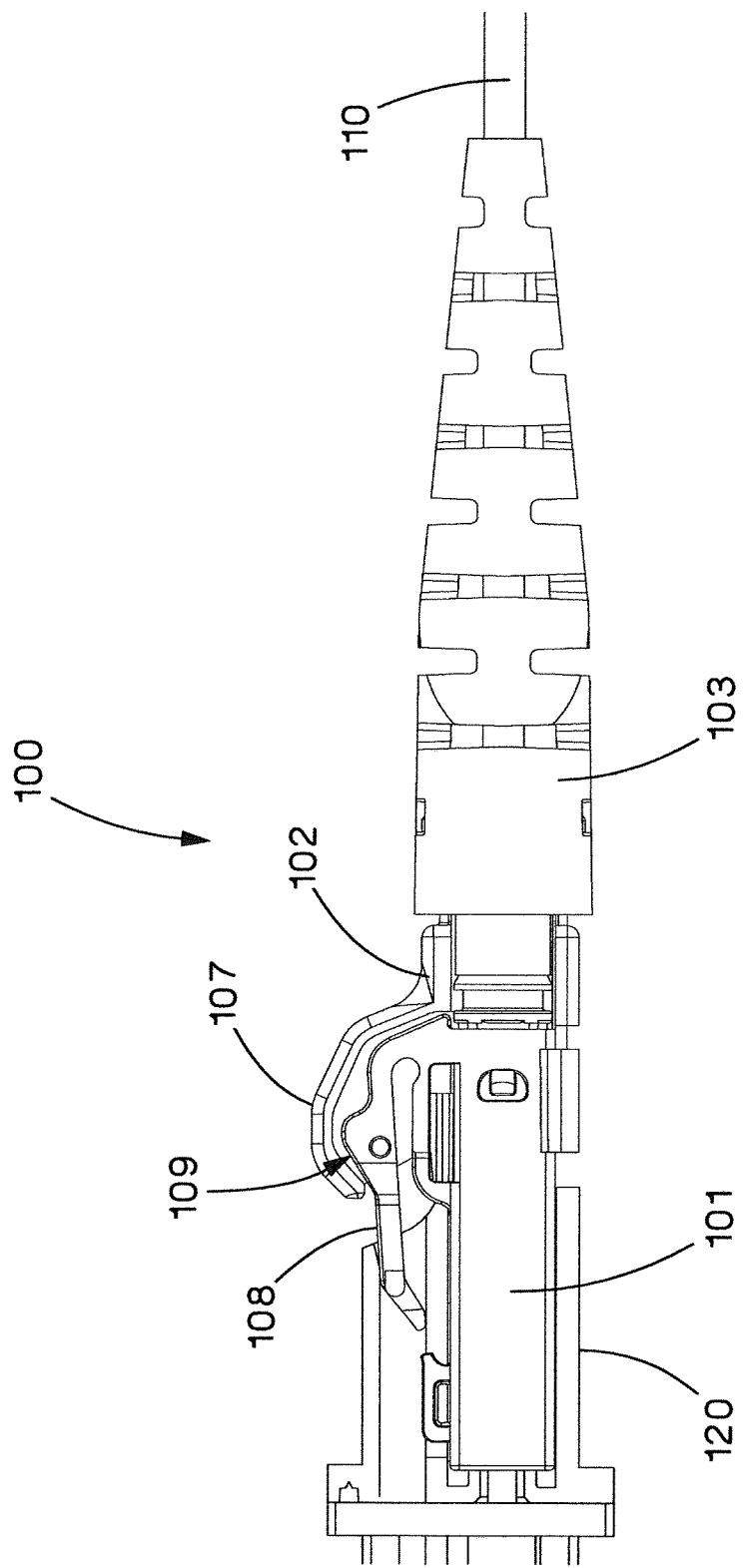
FIG. 6 is a cross-sectional view of the LC duplex clip assembly of FIG. 1 inserted into a port with the LC connector latches engaged with the port.
Figure 7:
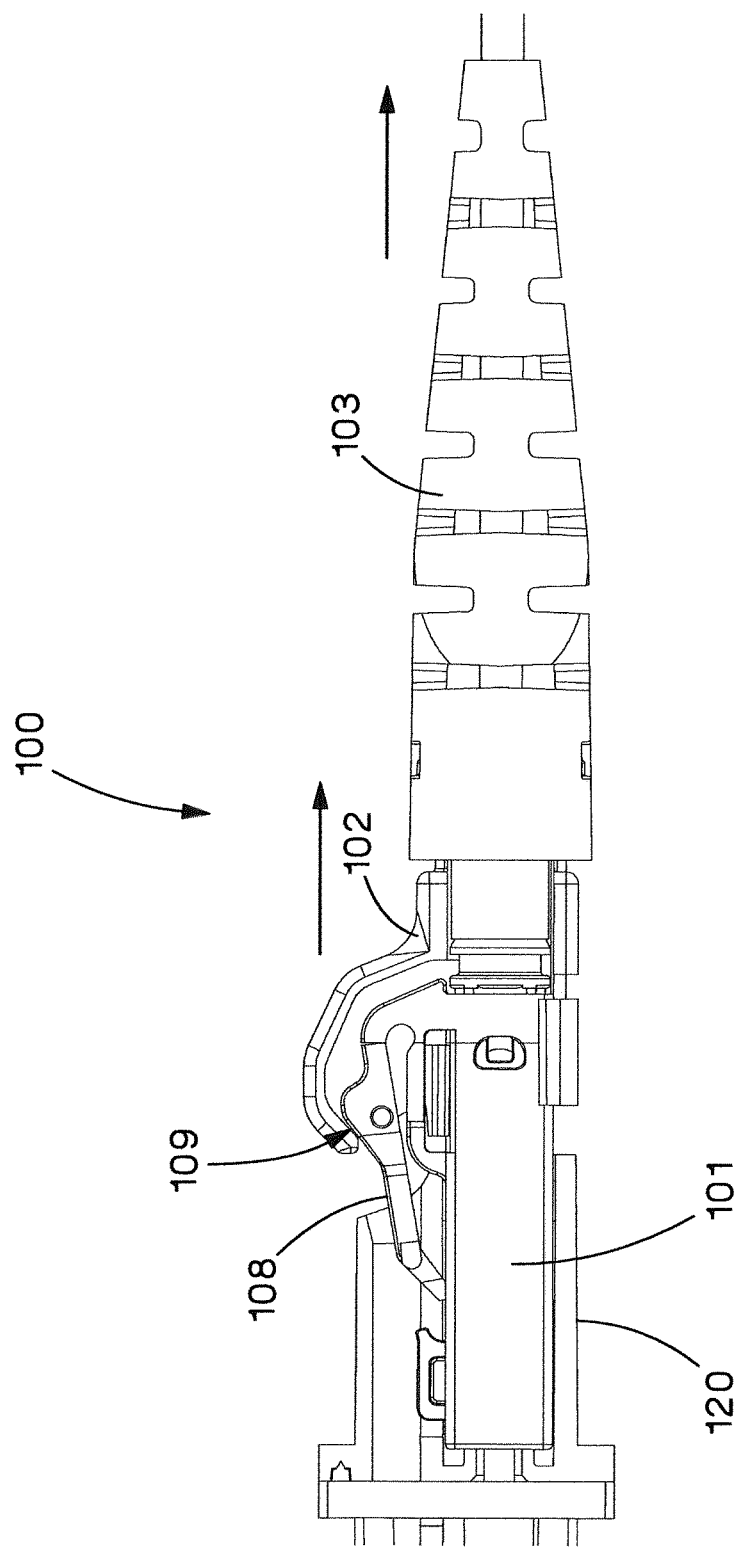
FIG. 7 is a cross-sectional view of the LC duplex clip assembly of FIG. 1 with the LC connector latches disengaged due to the clip body and boot being moved axially rearward relative to the LC connectors and cables.
Figure 8:
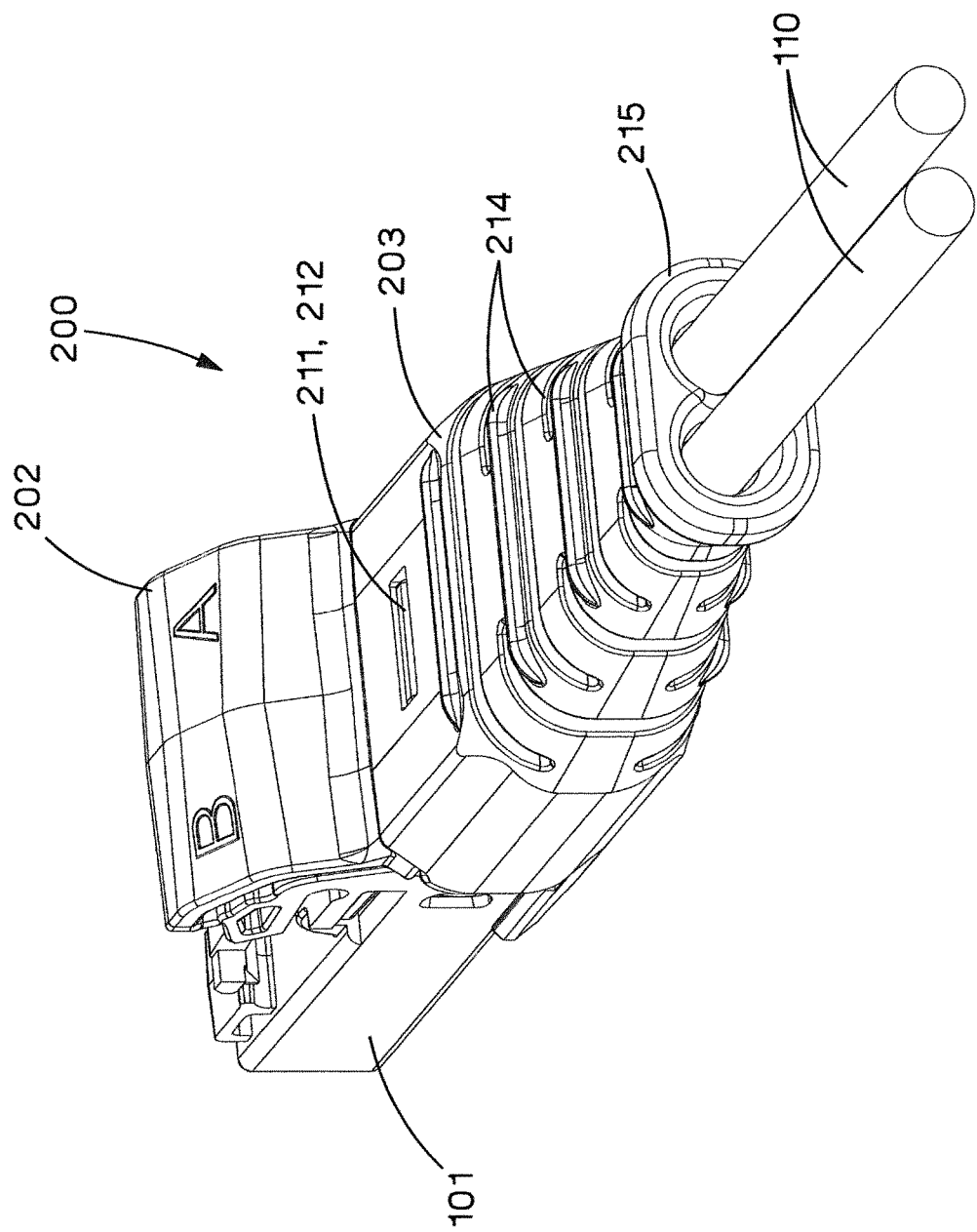
FIG. 8 is a perspective view of a second embodiment of a LC duplex clip assembly.
Figure 9:
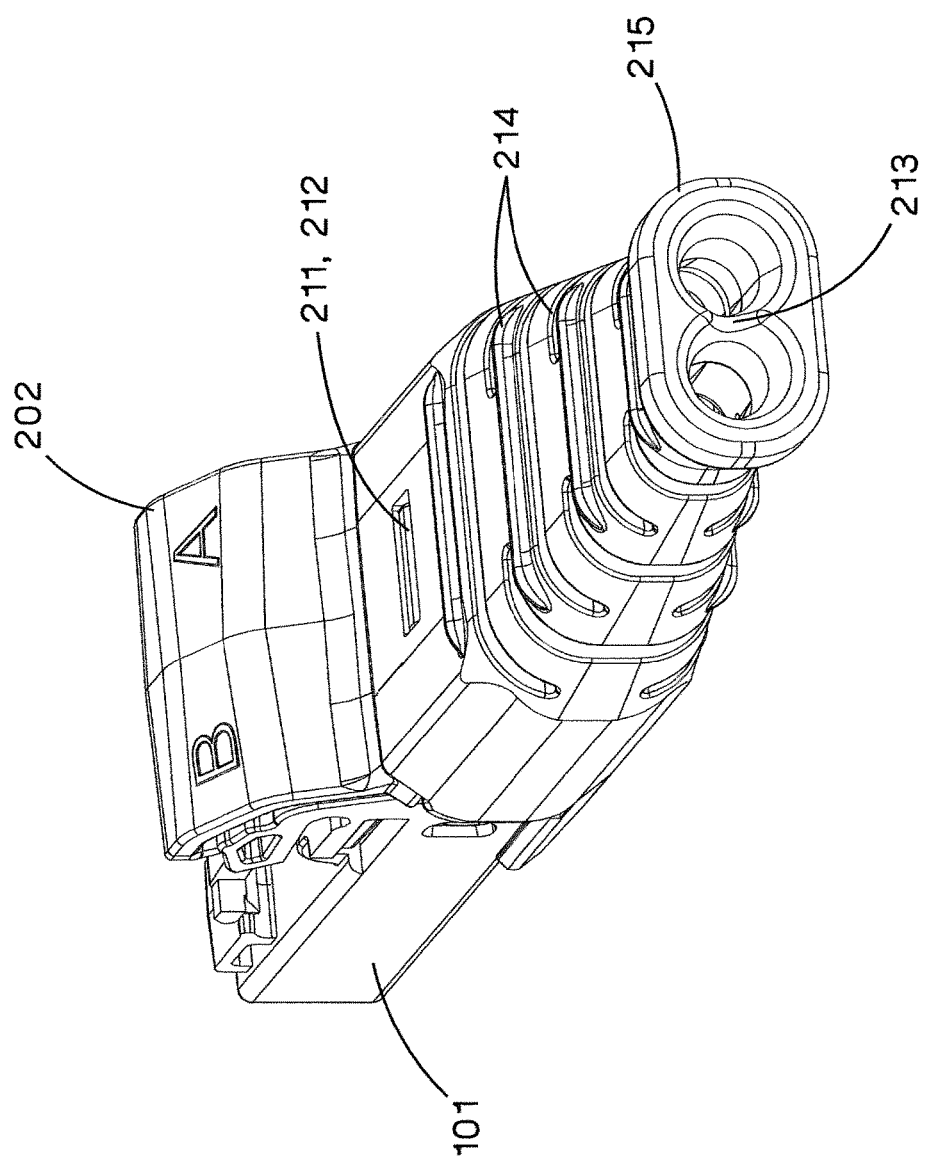
FIG. 9 is a perspective view of the LC duplex clip assembly of FIG. 8 with the cables disconnected from the LC connectors to better show the center stiffening member.
Figure 10:
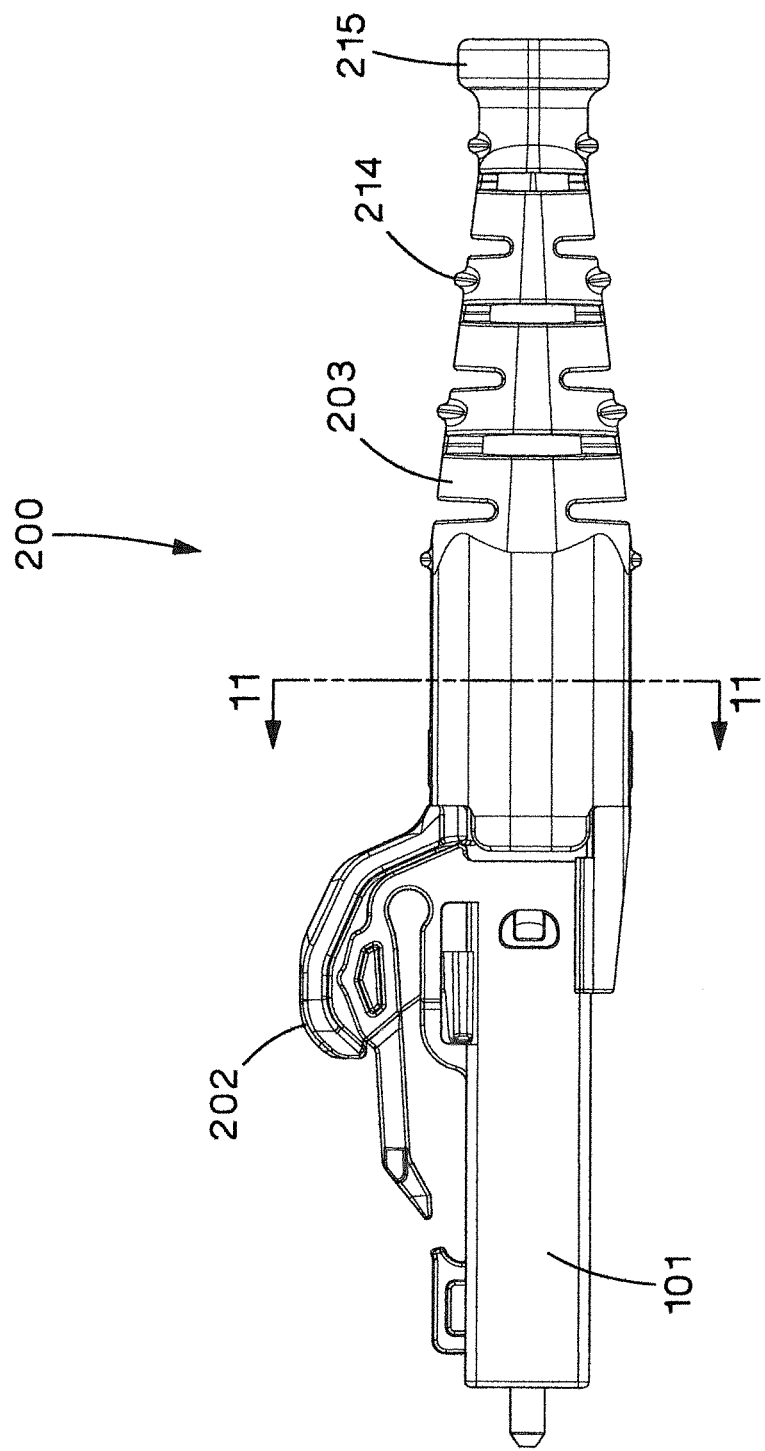
FIG. 10 is a side view of the LC duplex clip assembly of FIG. 8.
Figure 11:
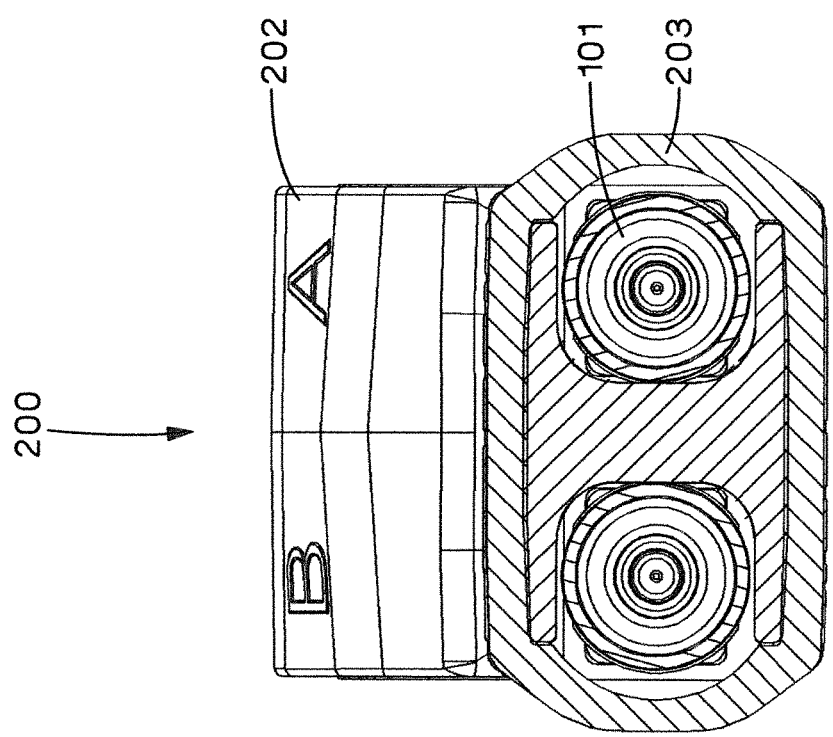
FIG. 11 is a cross-sectional view of the LC duplex clip assembly of FIG. 8 taken along line Z-Z of FIG. 10.
Figure 12:
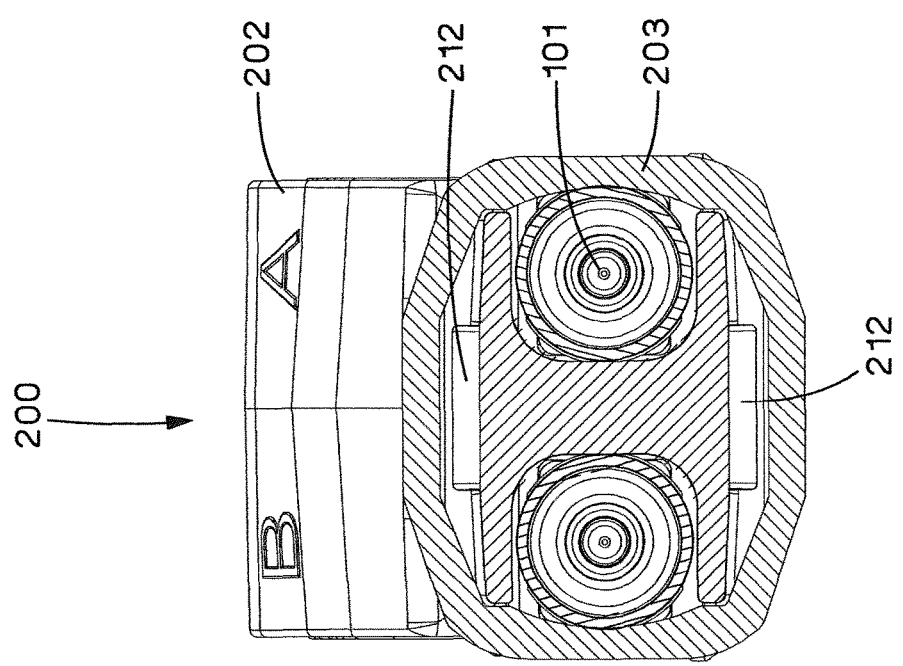
FIG. 12 is a cross-sectional view of the LC duplex clip assembly of FIG. 8 taken along line Z-Z of FIG. 10 with the side of the boot pressed in to disengage the engagement features of the boot from the engagement features of the clip body.

As best shown is FIGS. 6 and 7, moving the boot 103 and clip body 102 axially rearward relative to the LC connectors causes the hood 107 to engage the camming surfaces 109 of the LC connector latches 108 which in turn disengages the LC connector 101 from the port 120.

FIGS. 8-12 show a second embodiment of an LC duplex clip assembly 200. This embodiment adds a center stiffening member 213 to the boot 203. The center stiffening member 213 can help prevent the inner walls of the boot 203 from collapsing on the cables 110 when a compressive force, such as from gripping the boot 203 too tightly, is applied to the boot 203. If the walls of the boot 203 were allowed to collapse onto the cable 110, the friction created between the boot 203 and the cables 110 could restrict the free axial motion of the clip body 202 and boot 203. The center stiffening member 213 can be located proximate the end of the boot 203 opposite where the boot 203 connects to the clip body 202 in order to allow the boot 203 to flex for bend radius control.

As shown in FIGS. 8-12, the boot 203 can be connected to the clip body 102 via a second type of engagement features 211, 212 on the clip body 202 and boot 203. The engagement features 211, 212 shown in FIGS. 8-12, allow the boot 203 to be disengaged from the clip body 202 by squeezing the sides of the boot 203 to disengage the engagement features 211, 212 and then pulling the boot away from the clip body 202 (see specifically FIGS. 11 and 12). The simple removal process also allows the connectors 101 to be removed from the clip body 202 without a tool and switched from side-to-side in order to reverse the polarity of the duplex clip assembly 200, if necessary.

The boot 203 can also have raised grip surfaces 214 and an annular protrusion 215 to aid in gripping the boot 203.

Figure 13:
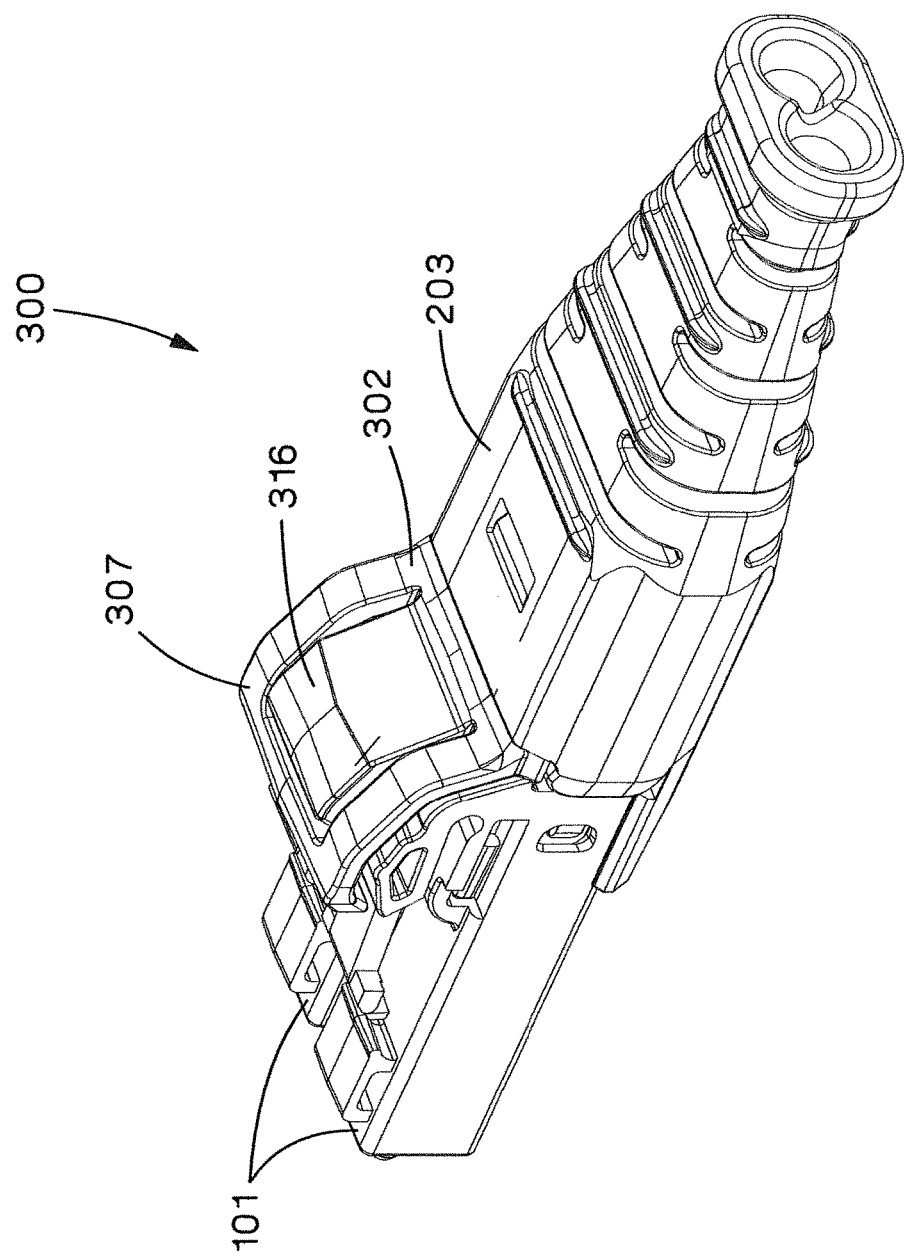
FIG. 13 is a perspective view of a third embodiment of an LC duplex clip assembly in which a portion of the hood forms a manual release lever.

FIG. 13 shows another embodiment of an LC duplex clip assembly 300 with a hood 307 in which a portion of the hood can operate as a manual release lever 316, allowing a user to disengage the LC connector latches 108 from their respective ports by either moving the boot 203 and clip body 302 rearward relative to the connectors 101 or by depressing the manual release lever 316.

FIGS. 14-17 show a fourth embodiment of an LC duplex clip assembly 400. This embodiment can be used in instances where two fibers are contained in a single cable, such as dual core jacketed cables. The assembly 400 includes a duplex housing 451, a housing cover 452, a crimp sleeve 453, a boot 454 and a pair of LC connectors 101.

Figure 14:
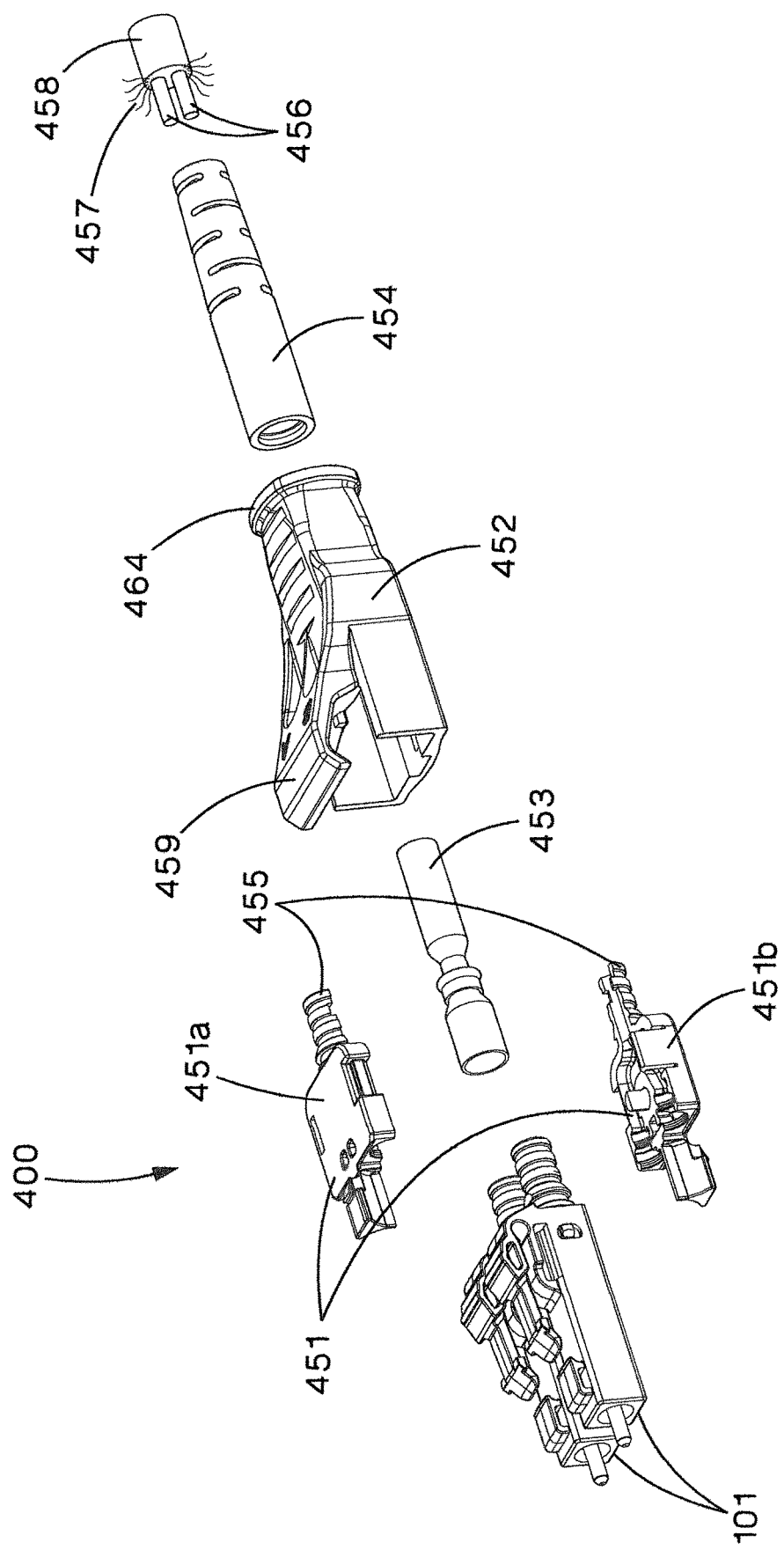
FIG. 14 is an exploded perspective view of a fourth embodiment of an LC duplex clip assembly.
Figure 15:
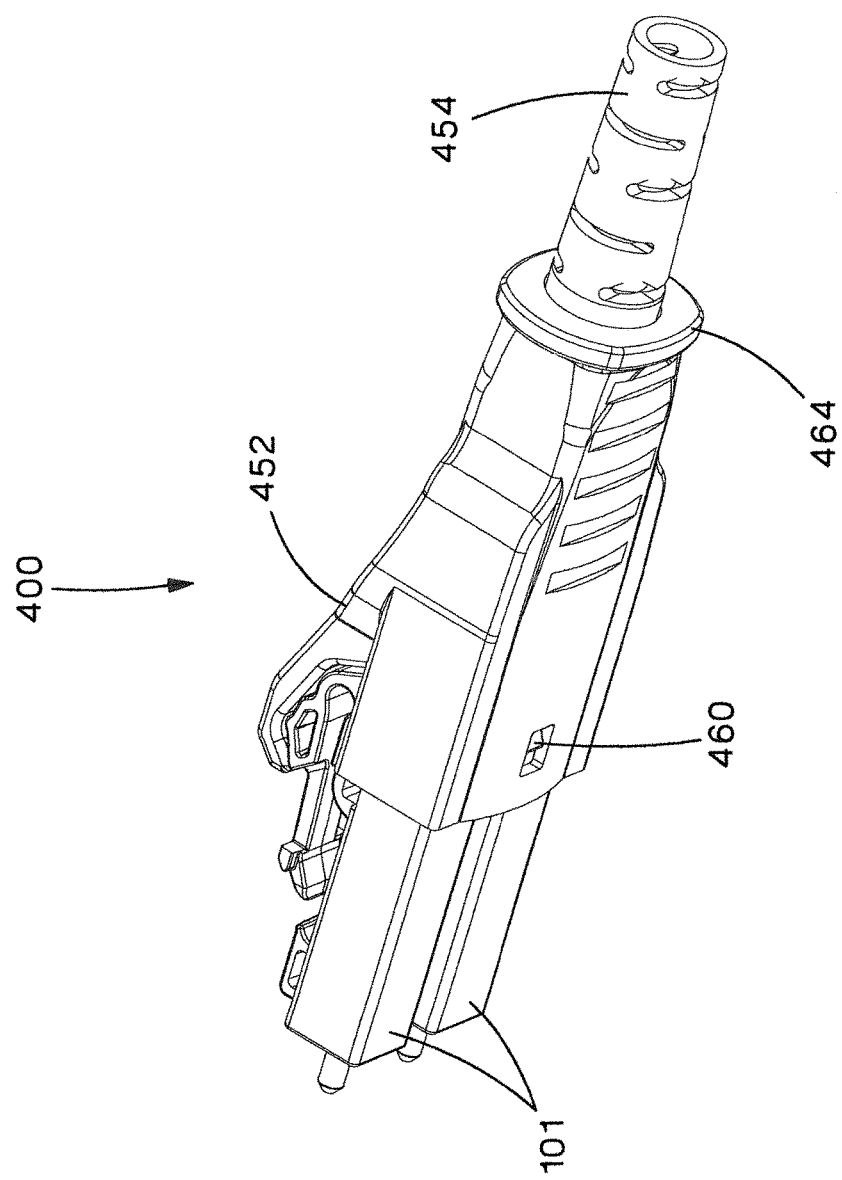
FIG. 15 is a bottom perspective view of the LC duplex clip assembly of FIG. 14.

The duplex housing 451 can be formed of two halves 451a, 451b and can have a backbone 455 integral with the housing halves (as shown in FIG. 14) or can be a separate piece trapped by the housing halves 451a, 451b. The duplex housing 451 is configured to retain the LC connectors 101 such as to allow them to rotate relative to the duplex housing 451. The optical fibers 456 of the cable 458 are terminated to the connectors 101 and the Kevlar fibers 457 of the cable 458 can be secured to the duplex housing 451 via the crimp sleeve 453.

The housing cover 452 has a hood 459 protruding from the top and is configured to loosely retain the duplex housing 451 and LC connectors 101 such as to allow the housing cover 452 to move axially relative to the LC connectors 101 and duplex housing 451. The housing cover 452 can also have an annular protrusion 464 to assist to aid in gripping the housing cover 452.

Figure 16:
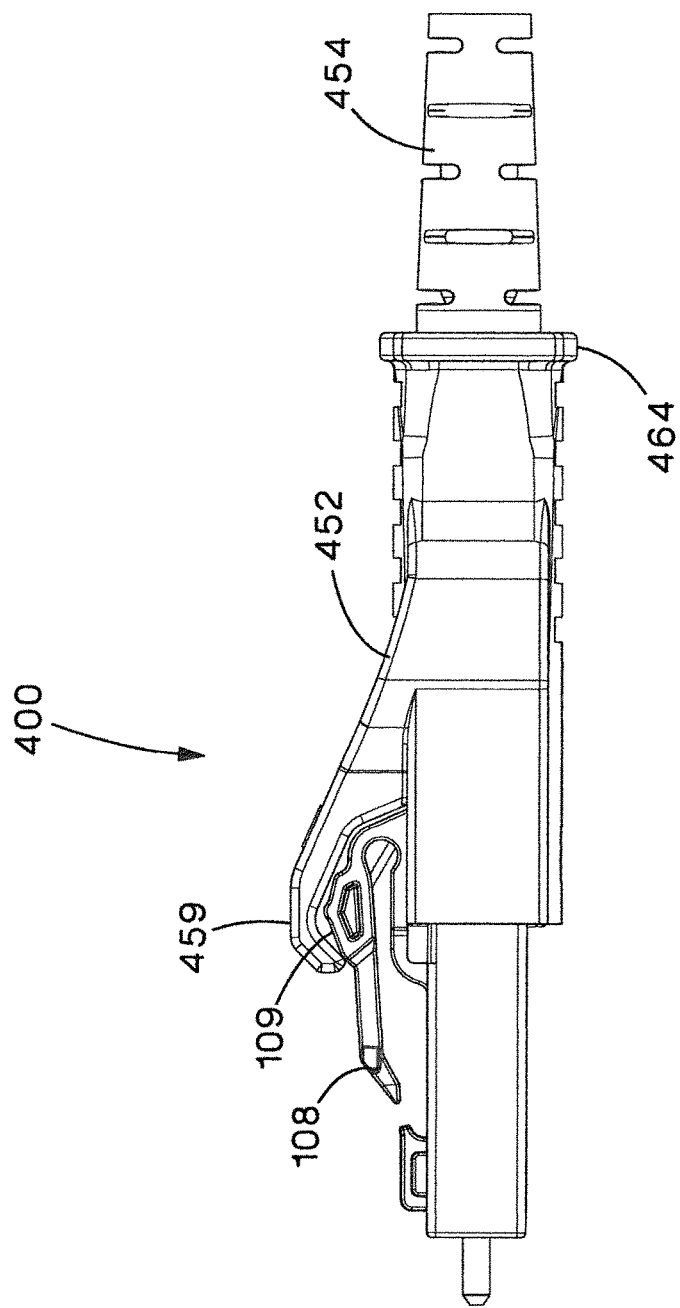
FIG. 16 is a side view of the LC duplex clip assembly of FIG. 14.
Figure 17:
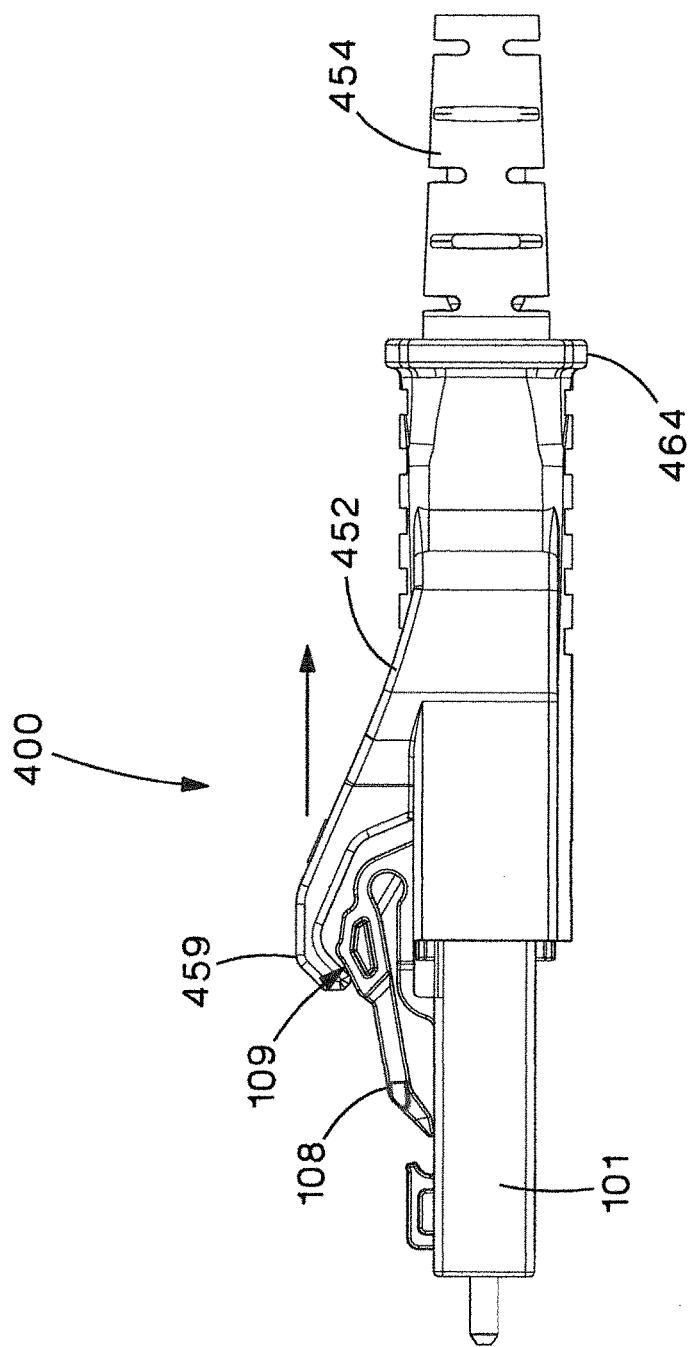
FIG. 17 is a side view of the LC duplex clip assembly of FIG. 14 with the LC connector latches depressed due to the housing cover being moved axially rearward relative to the LC connectors and duplex housing.
Figure 18:
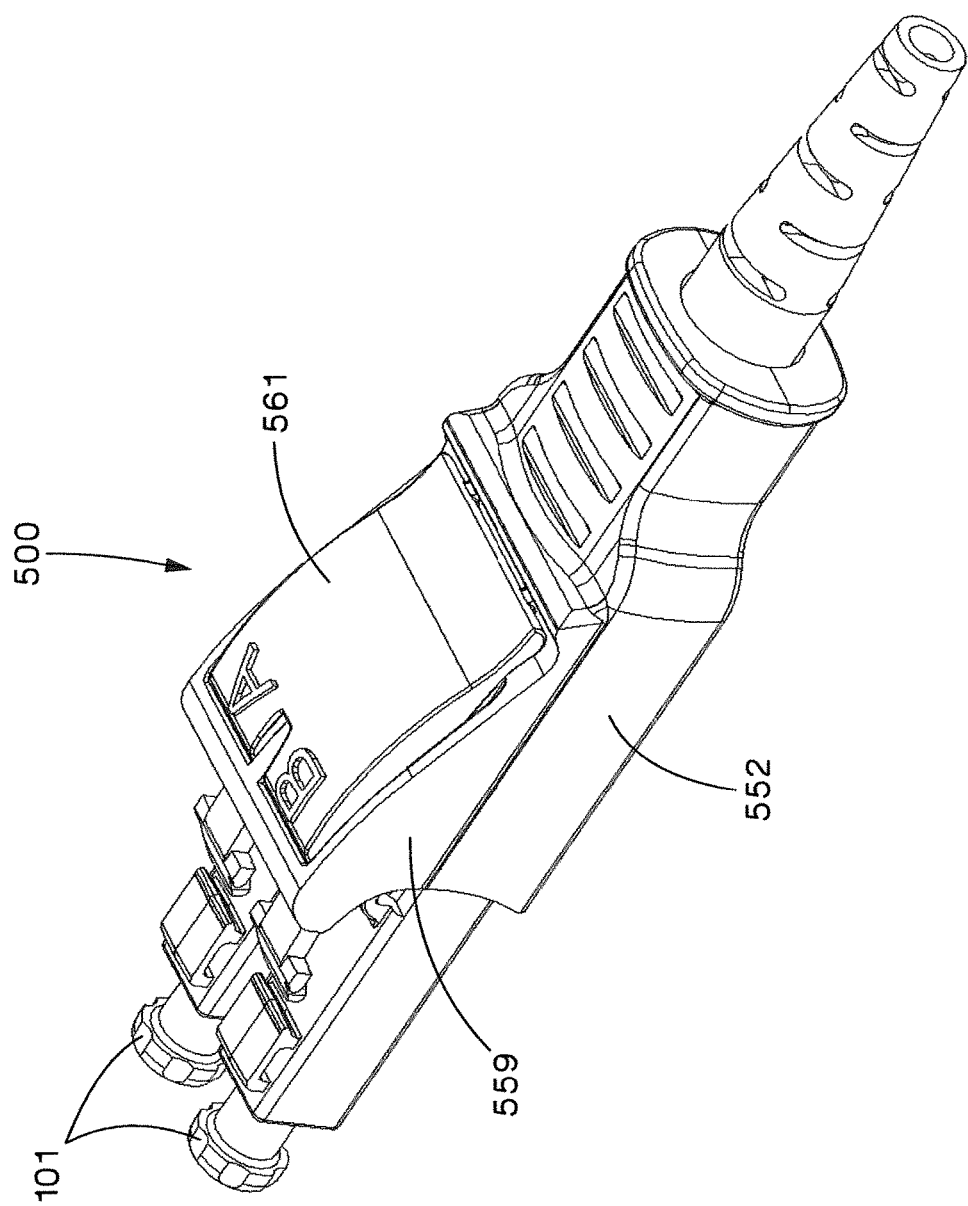
FIG. 18 is a perspective view of a fifth embodiment of an LC duplex clip assembly in which a portion of the hood forms a manual release lever.
Figure 19:
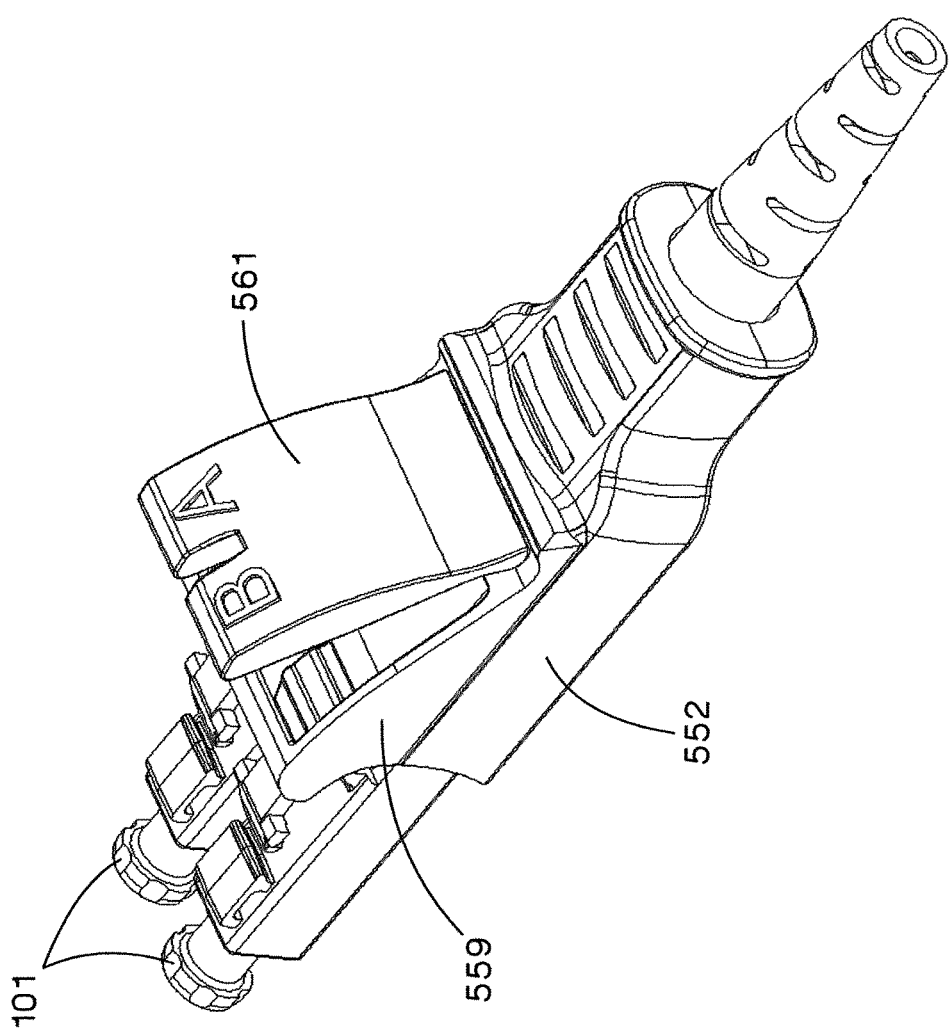
FIG. 19 is a perspective view of the LC duplex clip assembly of FIG. 18 with the manual release lever partially removed.
Figure 20:
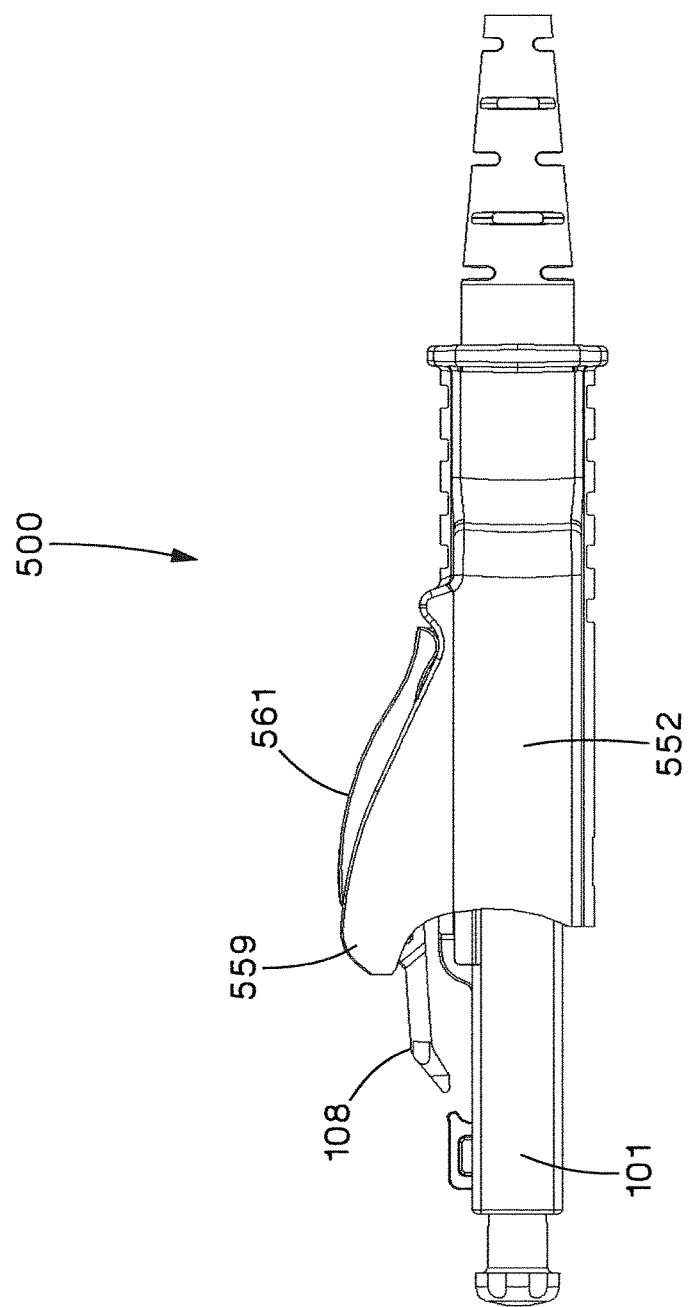
FIG. 20 is a side view of the LC duplex clip assembly of FIG. 18.
Figure 21:
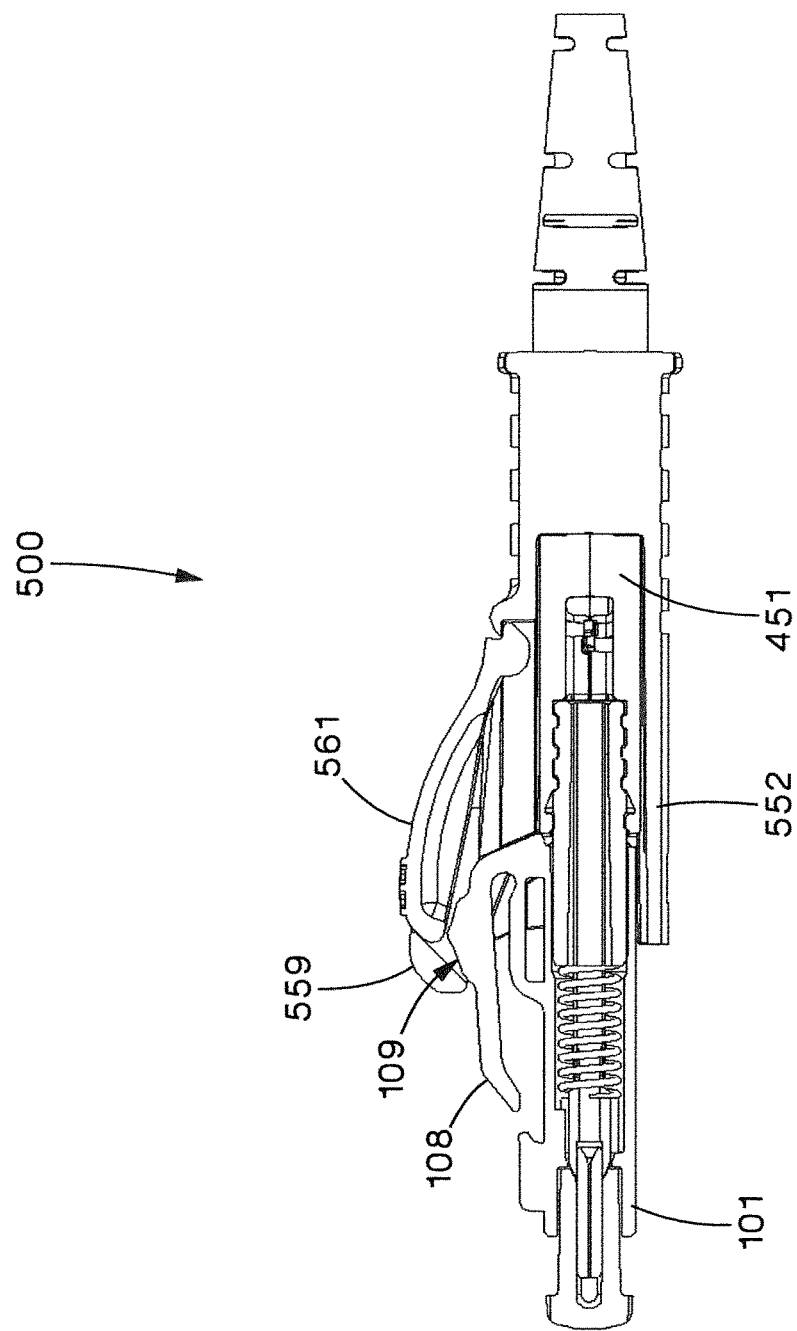
FIG. 21 is a cross-sectional view of the LC duplex clip assembly of FIG. 18.

As shown best in FIGS. 16 and 17, moving the housing cover 452 axially rearward relative to the LC connectors 101 and duplex housing 451 causes the hood 459 of the housing cover 403 to engage a camming surface 109 on the LC connector latches 108, which in turn allows the LC connectors 101 to be disengaged from a port 120.

If necessary, the LC duplex assembly 400 can be easily reversed in the field by squeezing the sides of the housing cover 452 to disengage the bottom snap 460, retracting the housing cover 452 from the duplex housing 451 and LC connectors 101, rotating each of the LC connectors 101 180 degrees relative to the duplex housing 451, rotating the housing cover 452 180 degrees relative to the duplex housing 451, and pushing the housing cover 452 forward onto the duplex housing 451.

FIGS. 18-21 show a fifth embodiment of an LC duplex assembly 500. This embodiment is similar to the fourth embodiment except a portion of the hood 559 of the housing cover 552 can also be used as a manual release lever 561 in order to allow a user to disengage the LC connectors 101 from their respective ports by either moving the housing cover 552 rearward relative to the connectors or by depressing the manual release lever 561. In one embodiment, the manual release lever 561 can snap into place on the remaining portion of the hood 559.

Figure 22:
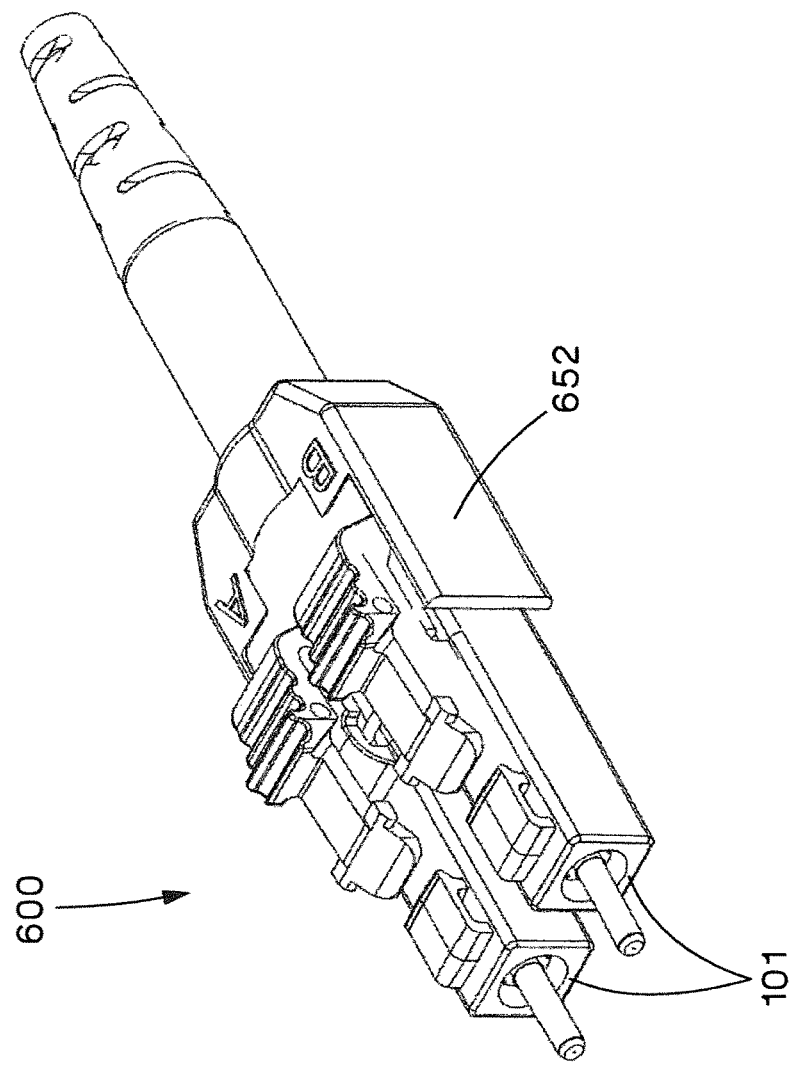
FIG. 22 is a perspective view of a sixth embodiment of an LC duplex clip assembly.

FIG. 22 shows a sixth embodiment of an LC duplex assembly 600. This embodiment has a housing cover 652 that does not have a hood and is not designed to move axially relative to the duplex housing and connectors. The housing cover 652, as in other embodiments, can be designed to provide side support and prevent the connectors 101 from rotating.

Figure 23:
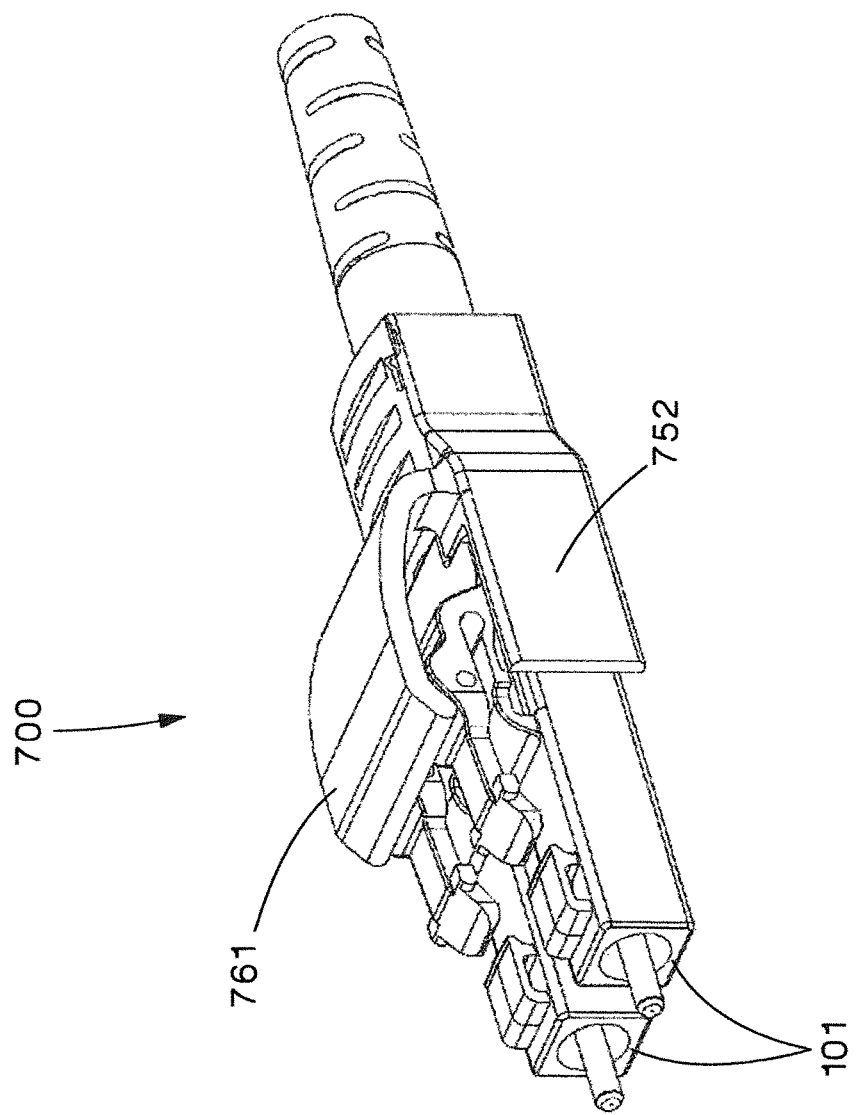
FIG. 23 is a perspective view of a seventh embodiment of an LC duplex clip assembly.
Figure 24:
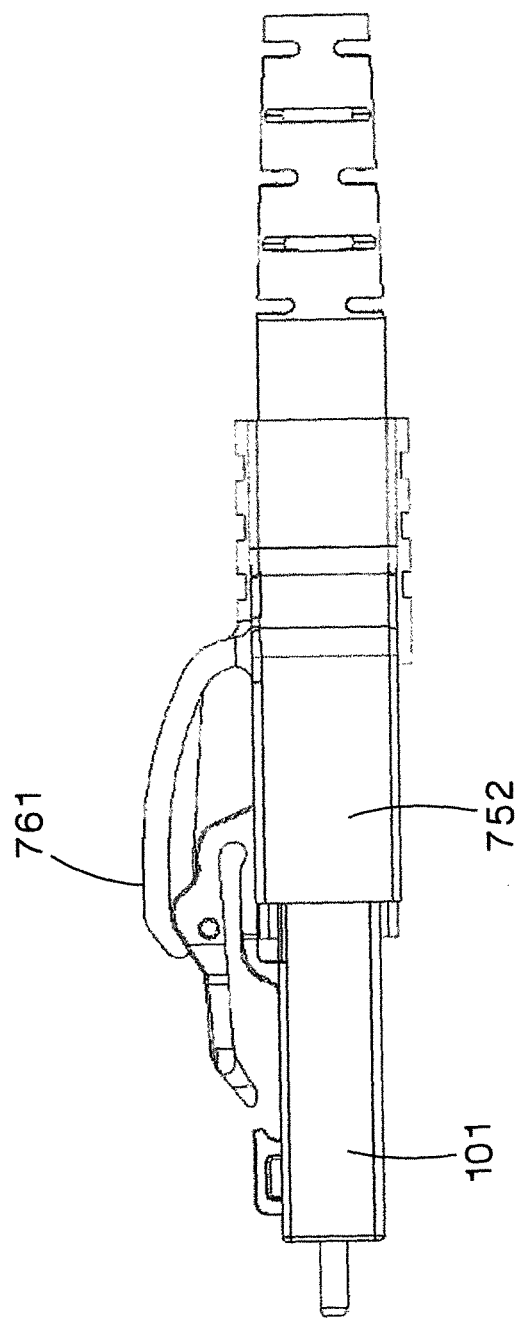
FIG. 24 is a side view of the LC duplex clip assembly of FIG. 23.
Figure 25:
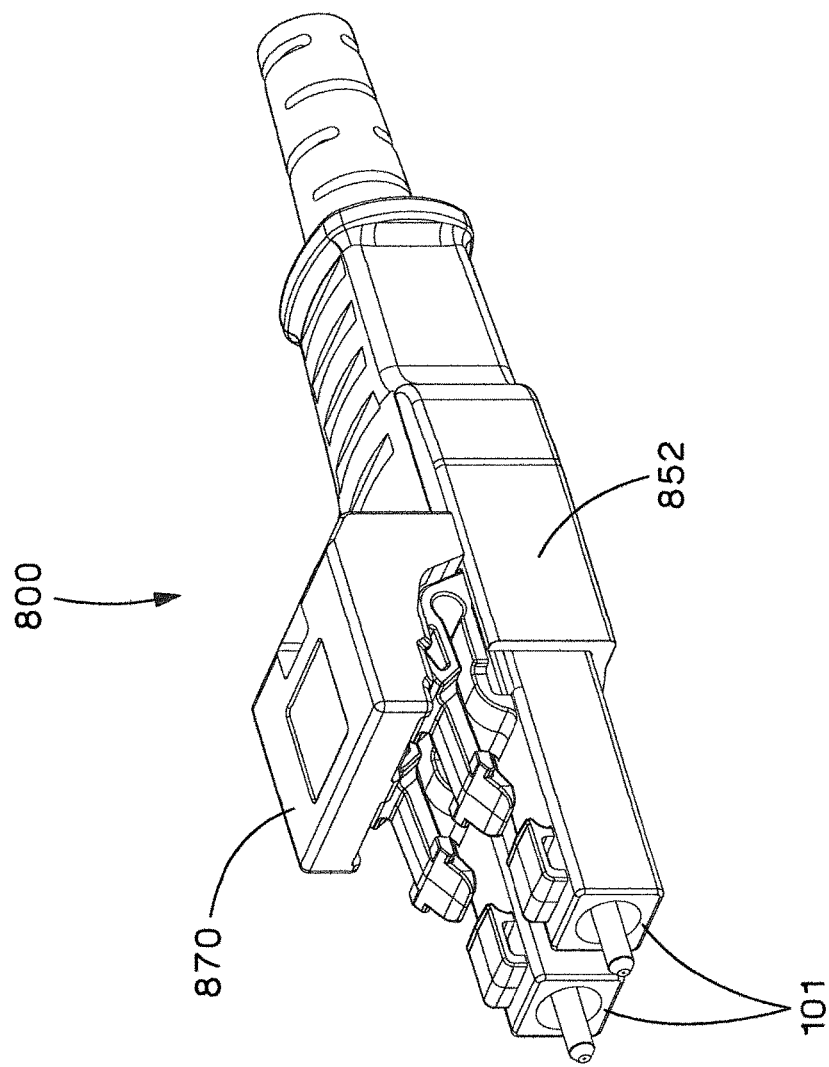
FIG. 25 is a perspective view of an eighth embodiment of an LC duplex clip assembly.
Figure 26:
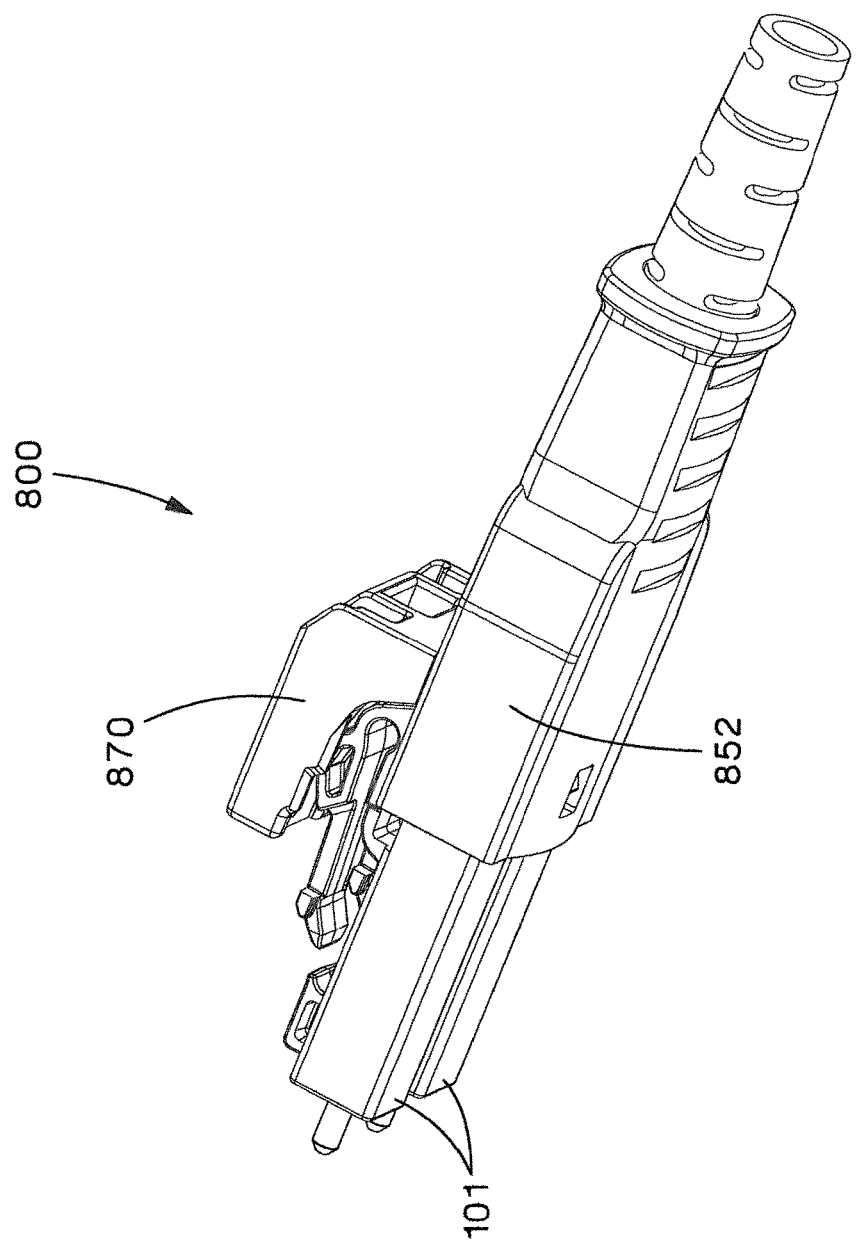
FIG. 26 is a bottom perspective view of the LC duplex clip assembly of FIG. 25.
Figure 27:
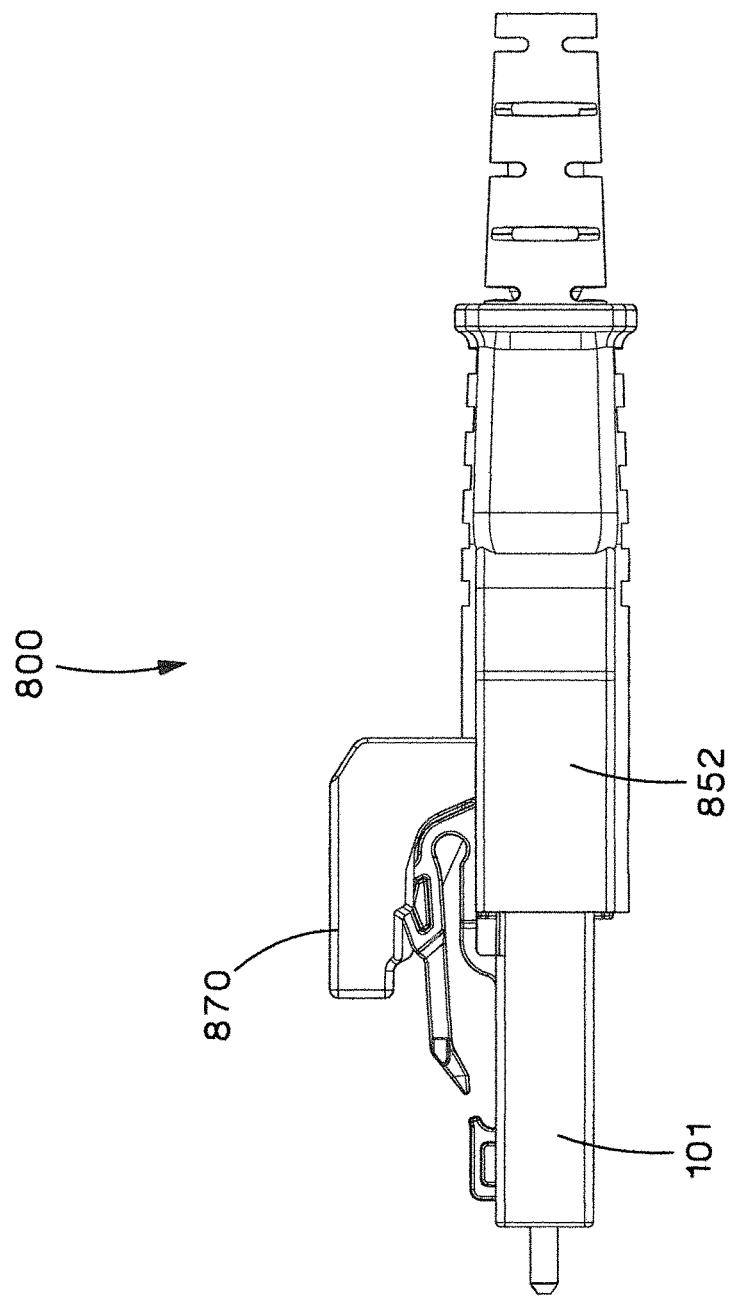
FIG. 27 is a side view of the LC duplex clip assembly of FIG. 25.
Figure 28:
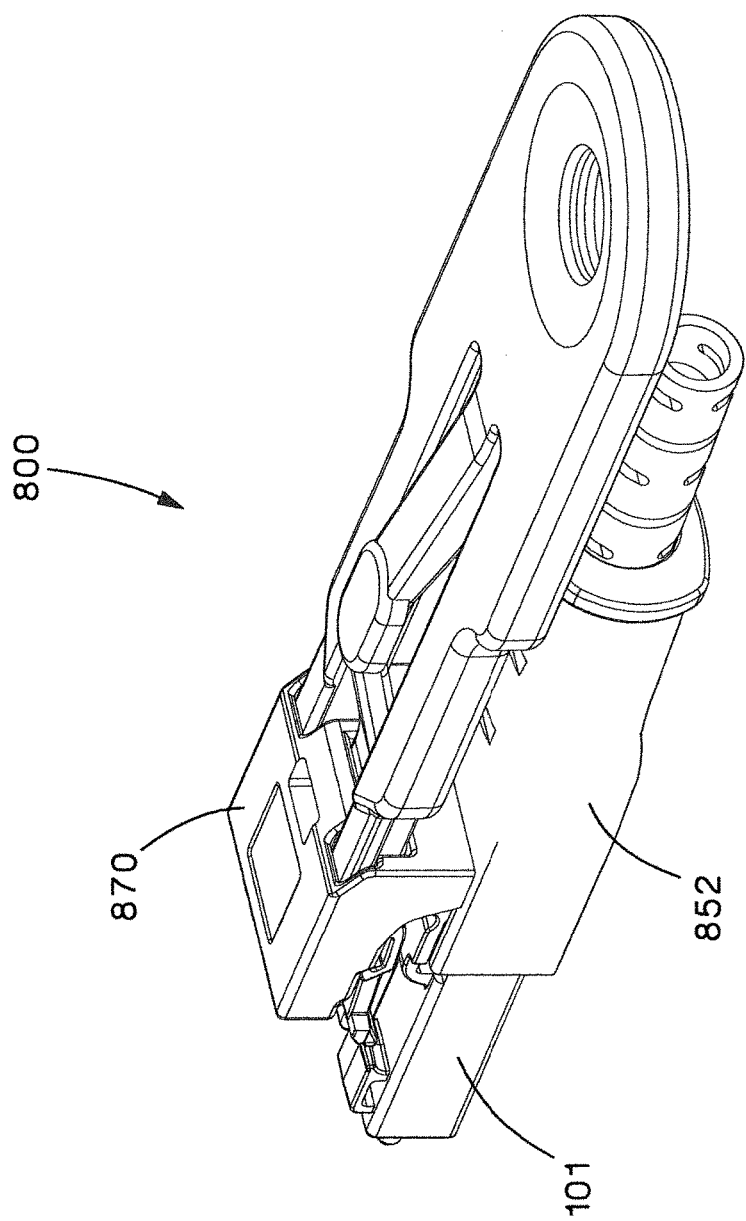
FIG. 28 is a perspective view of the LC duplex clip assembly of FIG. 25 with a lock-in release tool inserted.

FIGS. 23-24 show a seventh embodiment of an LC duplex assembly 700. This embodiment is similar to the sixth embodiment, except it has a manual release lever 761 extending from the top of the housing cover 752.

FIGS. 25-28 show an eighth embodiment of an LC duplex assembly 800. This embodiment is also similar to the sixth embodiment except the housing cover 852 has locking assembly 870 similar to the one described in U.S. Pat. No. 7,632,125, which is herein incorporated by reference in its entirety.

Figure 29:
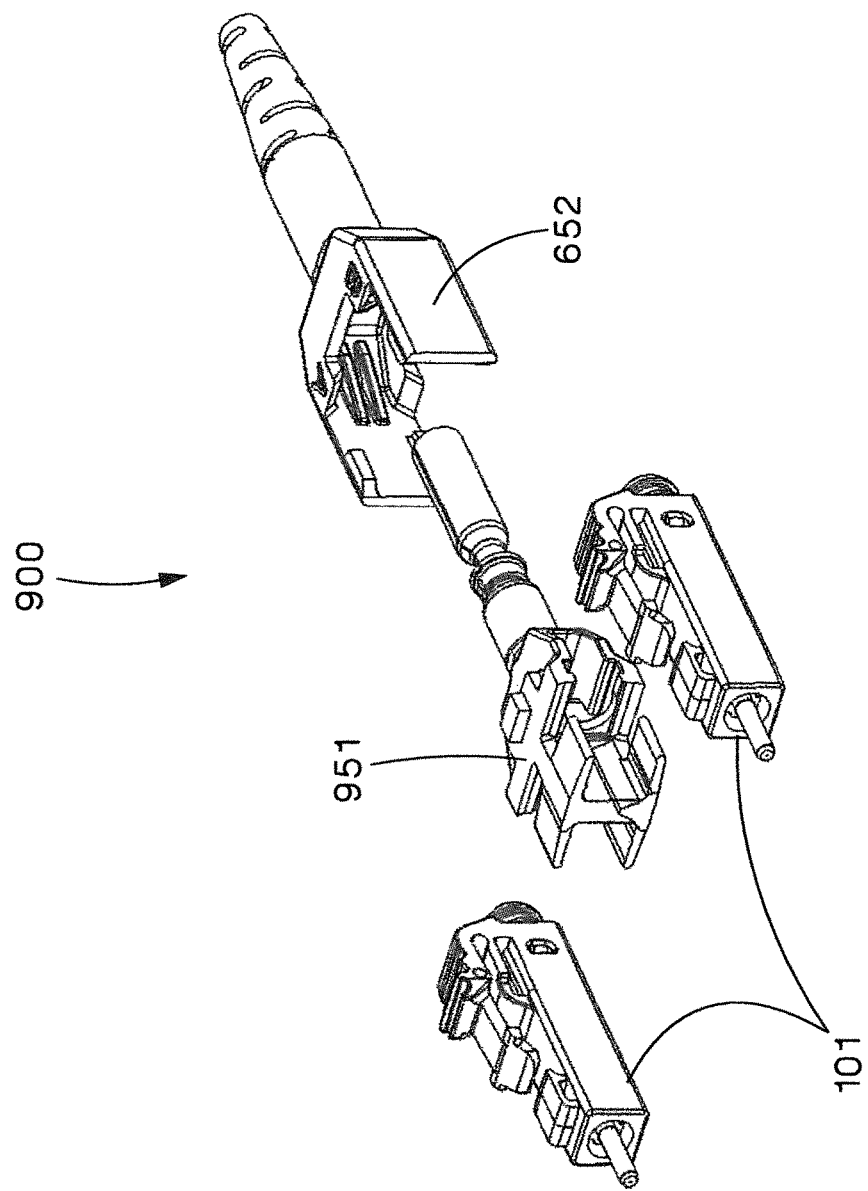
FIG. 29 is an exploded perspective view of a ninth embodiment of an LC duplex clip assembly.

FIG. 29 shows a ninth embodiment of an LC duplex clip assembly 900. This embodiment is similar to the sixth embodiment except the duplex housing 951 does not allow the connectors 101 to rotate relative to the duplex housing 951.

This embodiment 900 can also be easily reversed in the field by retracting the housing cover 652 from the duplex housing 951, sliding each connector 101 out of the duplex housing 951, rotating each connector 101 180 degrees relative to the duplex housing 951, sliding the LC connectors 101 back into the duplex housing 951, rotating the housing cover 652 180 degrees relative to the duplex housing 951, and sliding the housing cover 652 back onto the duplex housing 951.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

What is claimed:

1. A duplex clip assembly for use in aiding an insertion and removal of a pair of LC fiber optic plug connectors into complementary LC fiber optic jack connectors comprising:
   a duplex housing, the duplex housing configured to retain a portion of each LC fiber optic plug connector such as to allow each LC fiber optic plug connector to rotate relative to the duplex housing along an axis defined by an axis of a ferrule of the LC fiber optic plug connector, the housing further having a bottom snap located on an underside;
   a crimp sleeve attached to the duplex housing opposite of the LC fiber optic plug connectors for use in securing a dual core fiber optic cable to the duplex housing;
   a housing cover, the housing cover at least partially enclosing and loosely retaining the duplex housing with a clearance between the housing cover and an assembly of the duplex housing and LC fiber optic plug connectors such as to allow the housing cover to move axially relative to the assembly of the duplex housing and the LC connectors wherein axially is defined as parallel to a direction of insertion of the pair of LC fiber optic plug connectors into the complementary LC fiber optic jack connectors, the housing cover further having a slot located on an underside configured to engage the bottom snap of the duplex housing, the clearance fit also allowing an application of pressure on sides of the housing cover to result in the slot being disengaged from the bottom snap;
   a boot securely attached to the housing configured to partially enclose the dual core fiber optic cable attached to the LC fiber optic plug connectors, the boot also configured to remain attached to the housing cover when the housing cover is disengaged from the duplex housing and slid back along the dual core fiber optic cable; and
   a trigger mechanism attached to the housing cover, the trigger mechanism configured to allow a user to actuate latches located on the LC fiber optic plug connectors simultaneously.

2. The duplex clip assembly of claim 1 wherein the trigger mechanism comprises a lever.

3. The duplex clip assembly of claim 1 wherein the trigger mechanism comprises a camming hood.

4. The duplex clip assembly of claim 3 wherein the camming hood contains a lever integrated within, wherein the lever may also be used as a trigger mechanism.

\* \* \* \* \*